United States Patent [19]
Muramoto

[11] Patent Number: 6,124,890
[45] Date of Patent: *Sep. 26, 2000

[54] AUTOMATIC FOCUS DETECTING DEVICE

[75] Inventor: Tomotaka Muramoto, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,220

[22] Filed: Sep. 26, 1996

Related U.S. Application Data

[63] Continuation of application No. 08/263,123, Jun. 21, 1994, abandoned.

[30] Foreign Application Priority Data

Jun. 22, 1993 [JP] Japan ................................ 5-174902

[51] Int. Cl.⁷ .................................................. H04N 5/232
[52] U.S. Cl. ............................................ 348/345; 348/350
[58] Field of Search .................................. 348/345, 346, 348/349, 350, 352, 353, 354, 356

[56] References Cited

U.S. PATENT DOCUMENTS

| | | | |
|---|---|---|---|
| 4,317,135 | 2/1982 | Pitruzzello ............................. | 348/353 |
| 4,668,991 | 5/1987 | Theuwiseen et al. .................. | 348/345 |
| 4,739,401 | 4/1988 | Sacks et al. ............................ | 348/170 |
| 4,782,396 | 11/1988 | Park ...................................... | 348/353 X |
| 5,150,217 | 9/1992 | Senuma et al. ......................... | 348/353 |
| 5,204,749 | 4/1993 | Toyama et al. ......................... | 348/352 |
| 5,337,084 | 8/1994 | Nakamura ............................. | 348/353 X |
| 5,485,209 | 1/1996 | Muramoto et al. ..................... | 348/345 |

Primary Examiner—Tuan Ho
Attorney, Agent, or Firm—Robin, Blecker & Daley

[57] ABSTRACT

An automatic focus detecting device for obtaining focusing information on the basis of an image signal obtained by forming an image on an image sensor is provided with a detection area discriminating circuit arranged to discriminate whether an area from which the image signal is obtained is a focusing information detection area which is suited for detecting the focusing information, on the basis of a state of the image signal, and a detection area setting circuit arranged to set the focusing information detection area on the basis of a result of the discrimination made by the detection area discriminating circuit.

12 Claims, 22 Drawing Sheets

| | | | x(i, j-1) | | | | |
|---|---|---|---|---|---|---|---|
| | | x(i-1, j) | x(i, j) | x(i+1, j) | · · · · · · · · · · | | x(i+m, j) |
| | | | x(i, j+1) | | | | |
| | | | ⋮ | | | | |
| | | | x(i, j+n) | | | x(i+m, j+n) | |

F I G. 19
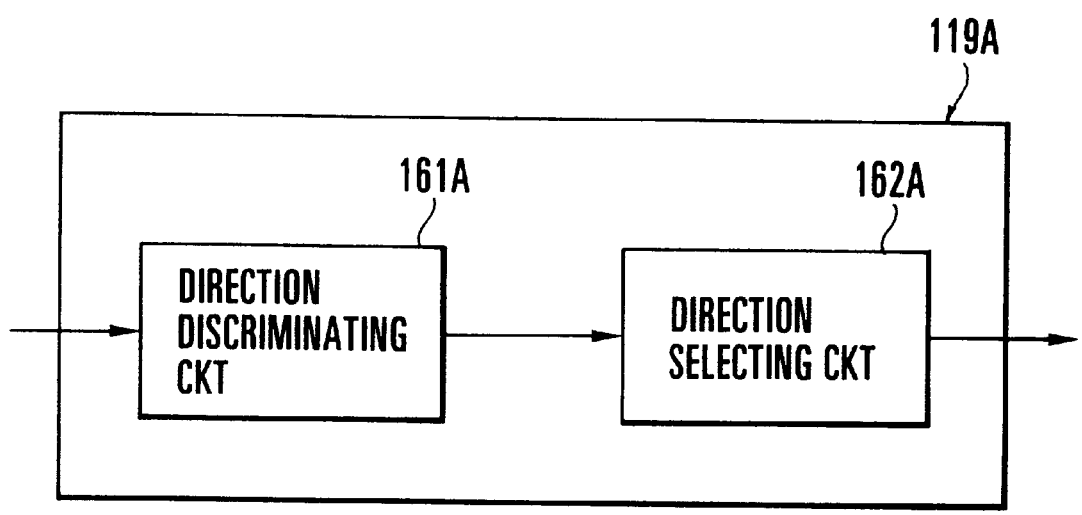

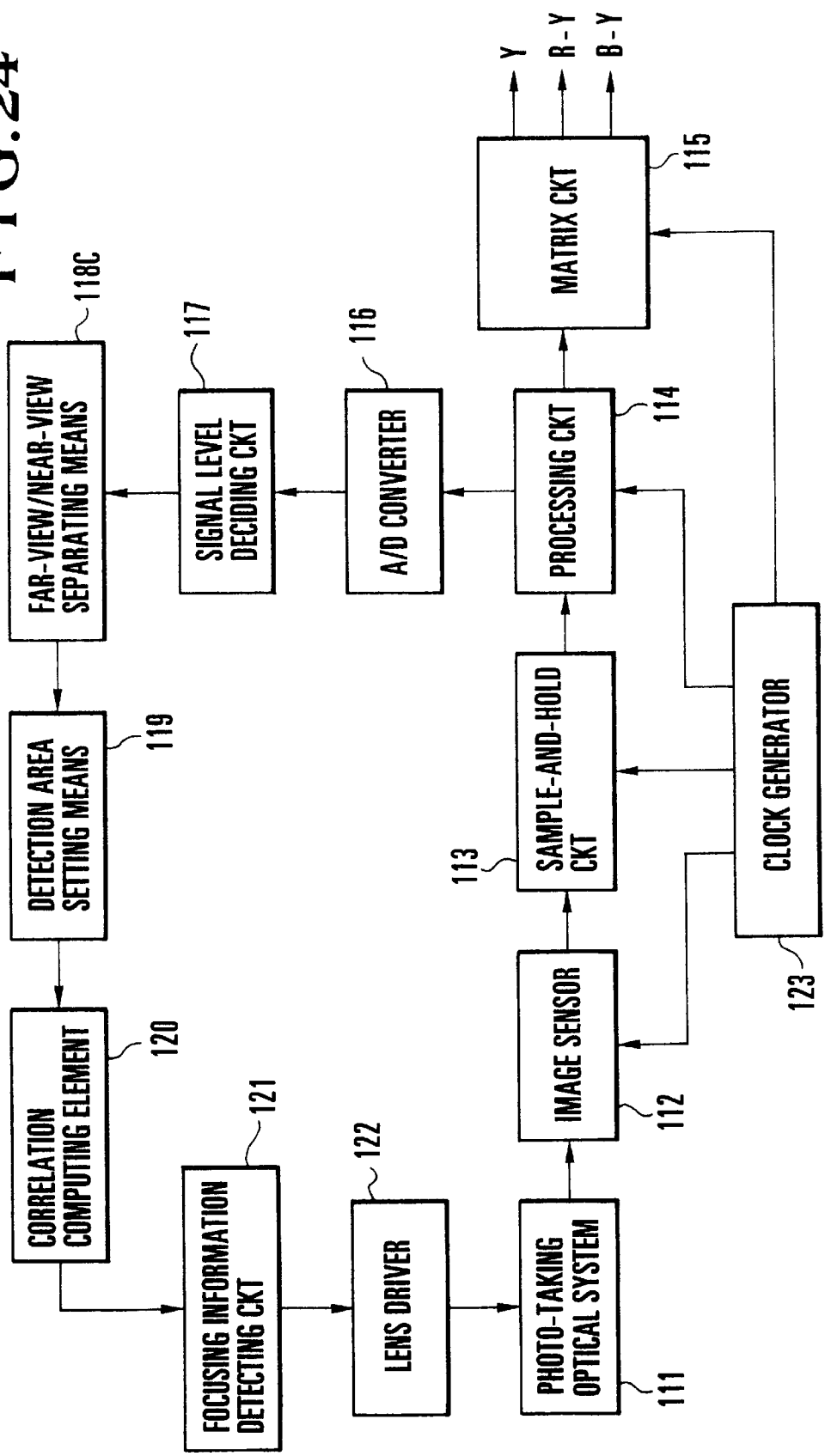

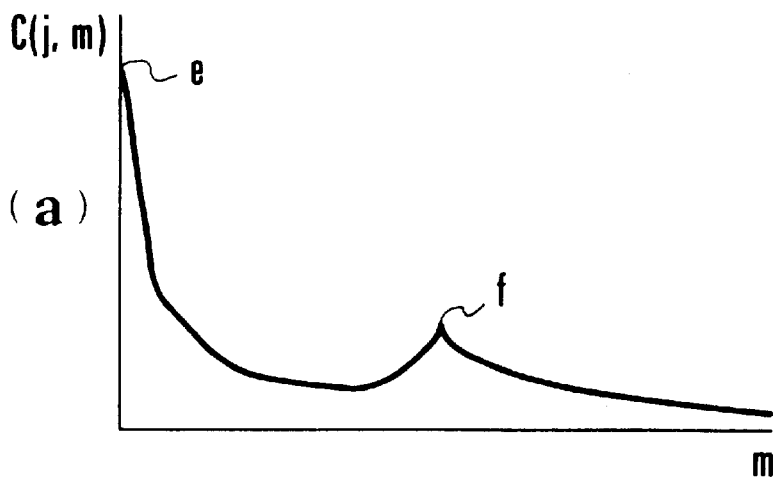
F I G. 26 (a)
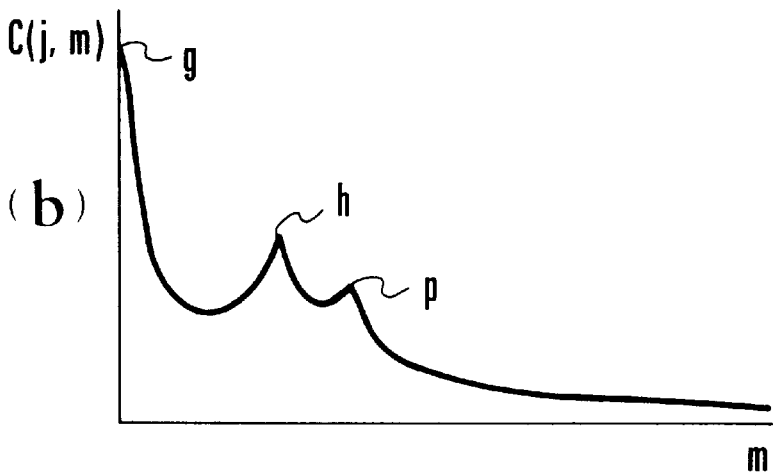
F I G. 26 (b)
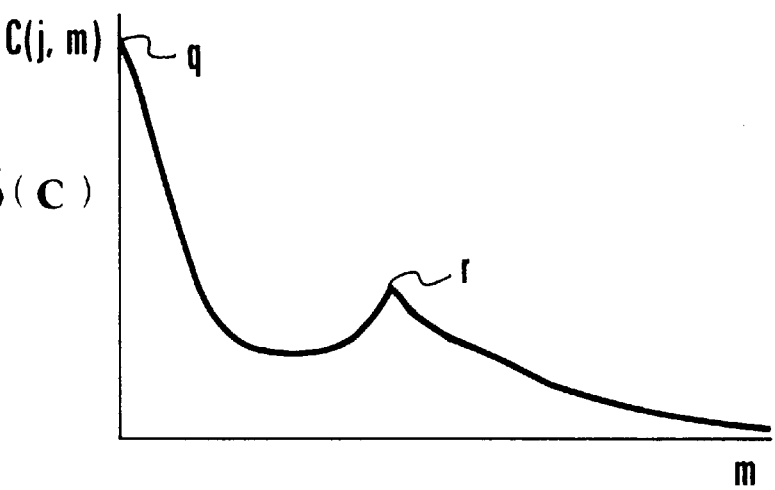
F I G. 26 (c)

AUTOMATIC FOCUS DETECTING DEVICE

This is a continuation application under 37 CFR 1.62 of prior application Ser. No. 08/263,123 filed on Jun. 21, 1994, now abandoned.

BACKGROUND OF THE INVENTION

1. Field of the Invention

This invention relates to an automatic focus detecting device arranged to detect the state of focusing on the basis of an image signal obtained by forming an image on an image sensor.

2. Description of the Related Art

Automatic focus detecting devices of varied kinds have hitherto been proposed. Among these devices, most of the devices adapted for video apparatuses such as video cameras or the like are arranged these days to detect the state of focusing by detecting the sharpness of images from an image signal.

In the conventional automatic focus detecting device of the kind detecting an in-focus position from an amount of focus deviation on the basis of an image signal obtained with images formed on an image sensor, a distance measuring frame is set in the middle part of a photo-taking area and the amount of focus deviation is inferred on the basis of a peak position obtained by computing an autocorrelation function using image data obtained from within the distance measuring frame.

In inferring a maximum correlation position in the above-stated manner using the result of computing the autocorrelation function, a differentiated value of the result of computation of the autocorrelation function is obtained, a position where the polarity of the differentiated value is inverted is detected and this position is decided to be the peak of correlation. In this instance, with a signal outputted from the image sensor assumed to be X(t), the result of computation of correlation to be C(τ), the result of differentiation of the computed value of correlation to be Y(τ) and the range of data to be used for distance measurement to be T, the result of correlation computation C(τ) is expressed by a formula (1) and the result of differentiation Y(τ) of the computed value of correlation by a formula (2) as follows:

$$C(\tau) = \frac{1}{T}\int_0^T X(t) \cdot X(t+\tau) dt \quad (1)$$

$$Y(\tau) = C(\tau) d/d\tau \quad (2)$$

Further, the result C(τ) of the computation of correlation has a characteristic as shown in FIG. 1 in relation to a variable T while the differentiation result Y(τ) of the computed correlation value has a characteristic as shown in FIG. 2. Peaks "b" and "c" are obtained at positions τb and τc as shown in FIG. 1. The polarity of the result Y(τ) of differentiation varies respectively at the positions τb and τc as shown in FIG. 2. In the conventional device, the polarity varies to a greater degree before and after the position τb than the position τc. The peak "b" of the position τb is, therefore, decided to be the peak of correlation.

In the conventional automatic focus detecting device described above, the peak of the autocorrelation function appears according to the period of an object of shooting if the object includes a periodic pattern. In such a case, therefore, it becomes hardly possible to discriminate any peak position that results from a focus deviation. Further, since the peak position is decided solely on the basis of the amount of change taking place at the fore-end part of the peak as shown in FIG. 2, if a steep peak exists even at a position where the correlation is not conspicuous, this position might be erroneously decided to be a maximum correlation position.

Another problem with the conventional device lies in the so-called far-and-near competition problem. In other words, in a case where a field obtained within the distance measuring frame includes both a near-distance view and a far-distance view, it becomes impossible to decide on which of them a focusing action should be made, the near-distance view or the far-distance view.

SUMMARY OF THE INVENTION

This invention is directed to the solution of the problems of the conventional automatic focus detecting device described in the foregoing. It is, therefore, a first object of this invention to provide an automatic focus detecting device which is capable of correctly discriminating a peak position resulting from a focus deviation even in cases where an object of shooting includes a periodic pattern.

It is a second object of this invention to provide an automatic focus detecting device which never misjudges a maximum correlation position even in the presence of a steep peak.

It is a third object of this invention to provide an automatic focus detecting device which is free from the above-stated far-and-near competition problem even in cases where a near-distance view and a far-distance view coexist within one and the same field.

To attain the first object, an automatic focus detecting device which is arranged as a preferred embodiment of this invention to obtain focusing information on the basis of an image signal obtained by forming an image on an image sensor includes detection area discriminating means for discriminating whether an area from which the image signal is obtained is a focusing information detection area which is suited for detecting the focusing information, on the basis of a state of the image signal, and detection area setting means for setting the focusing information detection area on the basis of a result of the discrimination made by the detection area discriminating means.

The device is thus arranged to discriminate whether an area from which an image signal is obtained with an image formed on an image sensor is a focusing information detection area which is an image area suited for detecting focusing information on the basis of a state of the image signal and to set the focusing information detection area on the basis of a result of the discrimination.

To attain also the first object, an automatic focus detecting device arranged as an embodiment of this invention to obtain focusing information on the basis of an image signal obtained by forming an image on an image sensor includes periodic pattern discriminating means for discriminating whether the image signal is obtained from an image having a periodic pattern, correlation computing means for obtaining an autocorrelation function of an output signal of the image sensor, and data selecting means for selecting, on the basis of a result of the discrimination made by the periodic pattern discriminating means, data of an image area which has no periodic pattern while avoiding any image area having a periodic pattern, wherein it is discriminated, on the basis of the data selected by the data selecting means, whether an area from which the image signal is obtained is a focusing information detection area which is suited for detecting, the focusing information. The device thus discriminates whether the image signal obtained with an image formed on the image sensor has a periodic pattern, selects data of an image area having no periodic pattern while avoiding any image area having a periodic pattern, and discriminates, on the basis of the result of the discrimination, whether an area from which the image signal is obtained is the focusing information detection area.

To attain the second object, an automatic focus detecting device arranged as a preferred embodiment of this invention to obtain focusing information by computing by correlation computing means a correlation of image information obtained by forming an image on an image sensor includes reliability deciding means for deciding, on the basis of states of a plurality of peaks of a correlation computing output value of the correlation computing means, the reliability of the peaks.

The device is thus arranged to compute an autocorrelation function on the basis of the state of an image signal obtained by forming an image on the image sensor, to decide, on the basis of states of a plurality of peaks of the autocorrelation function, the reliability of the peaks and to set a focusing information detection area according to the result of the decision.

To attain the third object, an automatic focus detecting device arranged as a third embodiment of this invention to obtain focusing information on the basis of an image signal obtained from within a distance measuring frame by forming an image on an image sensor includes separating means for separating from each other images of far-distance and near-distance views obtained within the distance measuring frame, picture element number comparison means for comparing the area, or the number of picture elements, of the image of the far-distance view with that of the image of the near-distance view, and focusing control means for bringing into focus a selected one of the images of the far-distance and near-distance views which shows a larger value as a result of the comparison made by the picture element number comparison means.

The device is thus arranged to separate the images of far-distance and near-distance views from each other, to compare the areas, or the numbers of picture elements, of the images obtained within the distance measuring frame set on the image sensor, and to bring into focus the image found to have a larger value through comparison.

These and other objects and features of this invention will become apparent from the following detailed description of embodiments thereof taken in conjunction with the accompanying drawings.

BRIEF DESCRIPTION OF THE DRAWINGS

FIG. 19 is a block diagram showing the essential parts of an automatic focus detecting device arranged as a fourth embodiment of this invention.

FIG. 24 is a block diagram showing the arrangement of an automatic focus detecting device arranged as a fifth embodiment of this invention.

FIGS. 26(a), 26(b) and 26(c) are characteristic diagrams showing examples of autocorrelation functions obtained by the same device.

DETAILED DESCRIPTION OF THE PREFERRED EMBODIMENT

Some of the embodiments of this invention are described below with reference to the drawings:
(First Embodiment)

Figure 1:
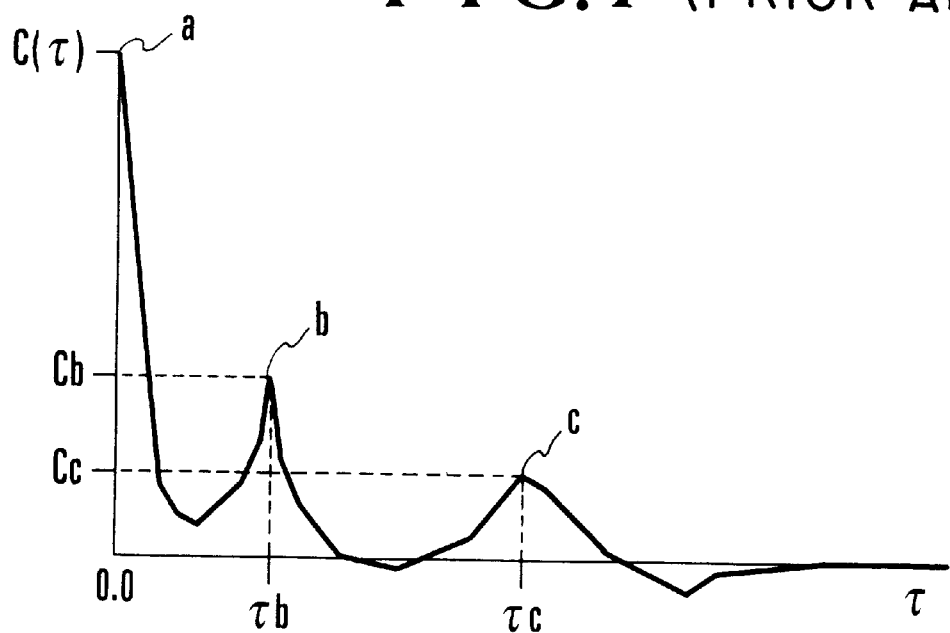
FIG. 1 is a characteristic diagram showing by way of example an autocorrelation function.
Figure 2:
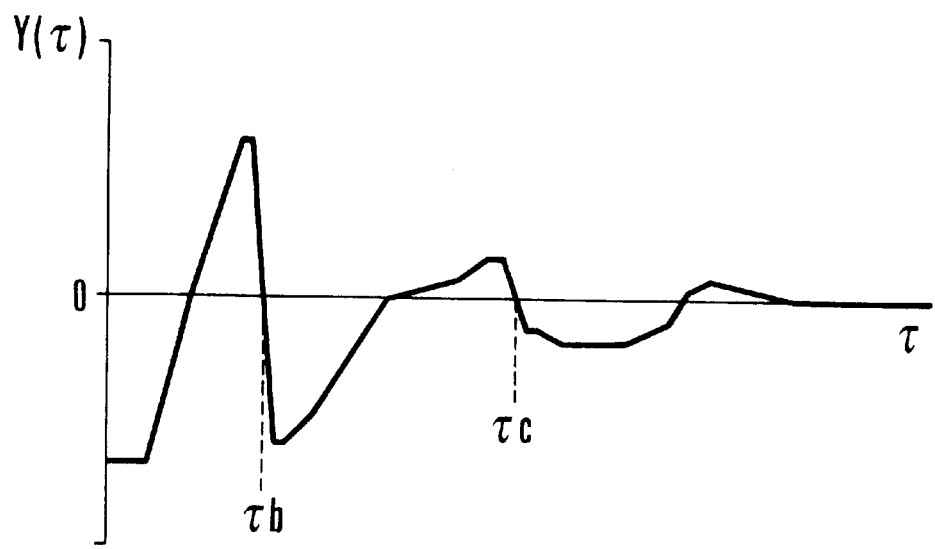
FIG. 2 is a characteristic diagram showing the differentiated values of the autocorrelation function.
Figure 3:
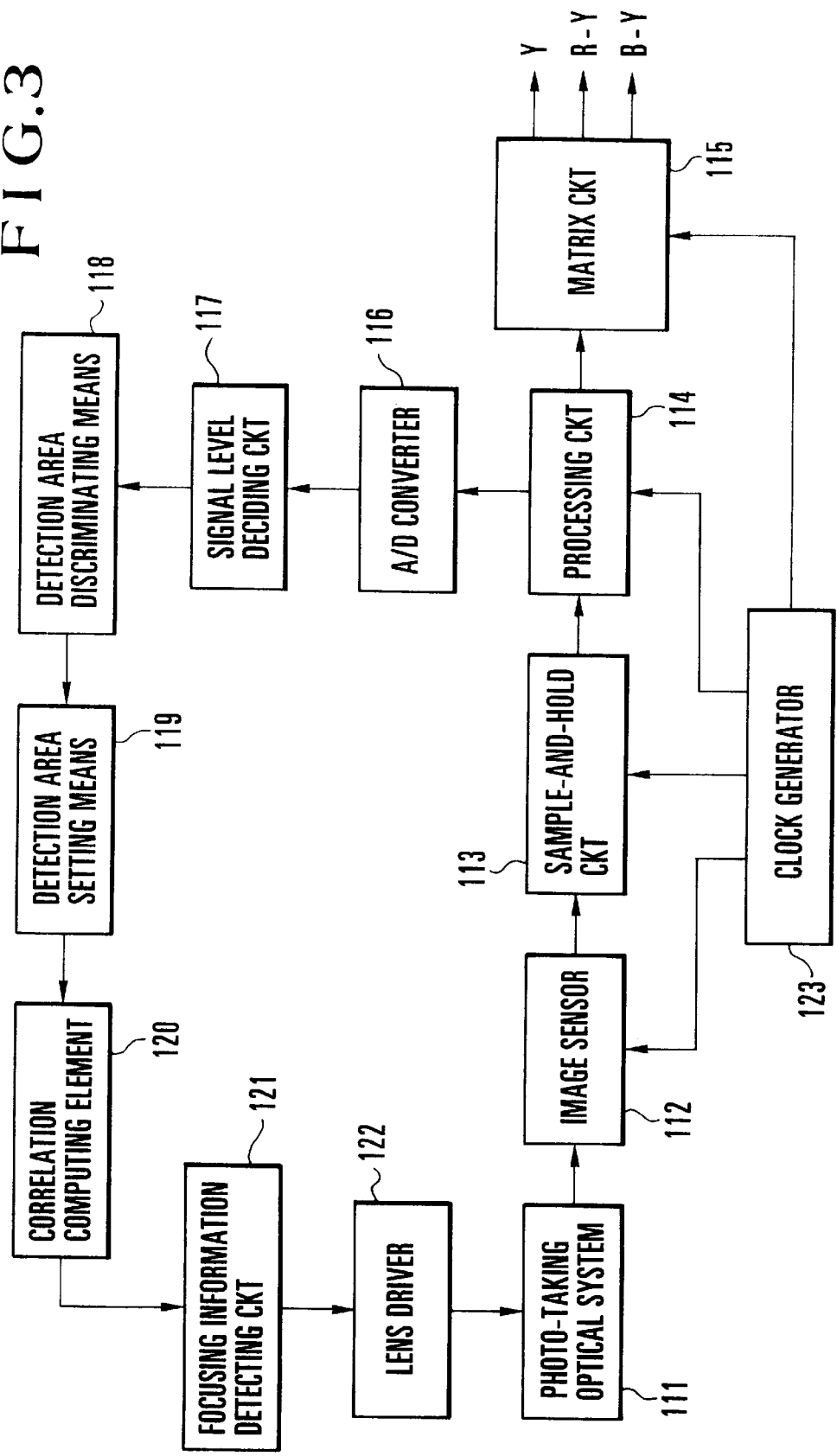
FIG. 3 is a block diagram showing the arrangement of an automatic focus detecting device which is arranged as a first embodiment of this invention.
Figure 4A:
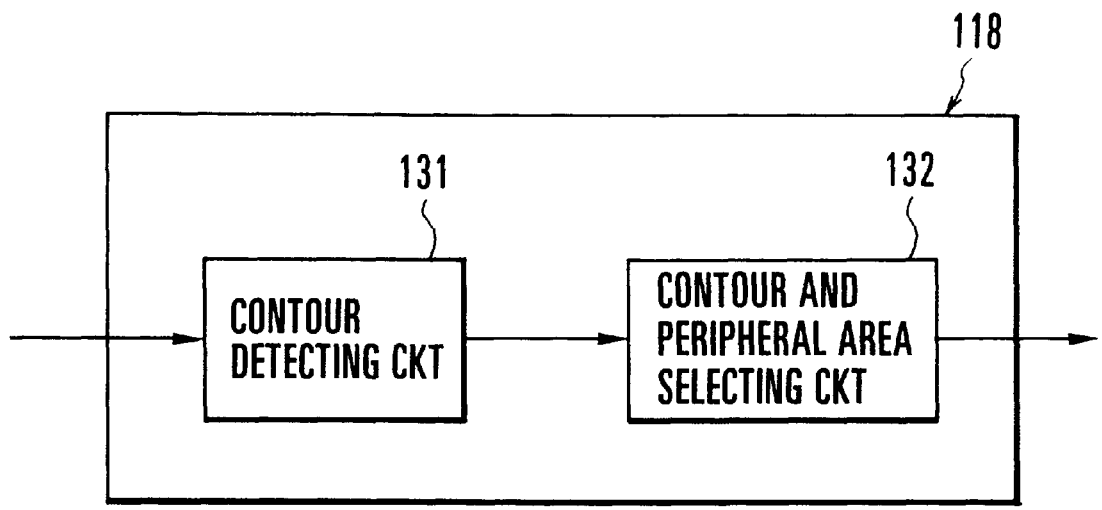
FIGS. 4(a) and 4(b) are block diagrams showing the arrangement of detection area discriminating means of the same automatic focus detecting device.
Figure 4B:
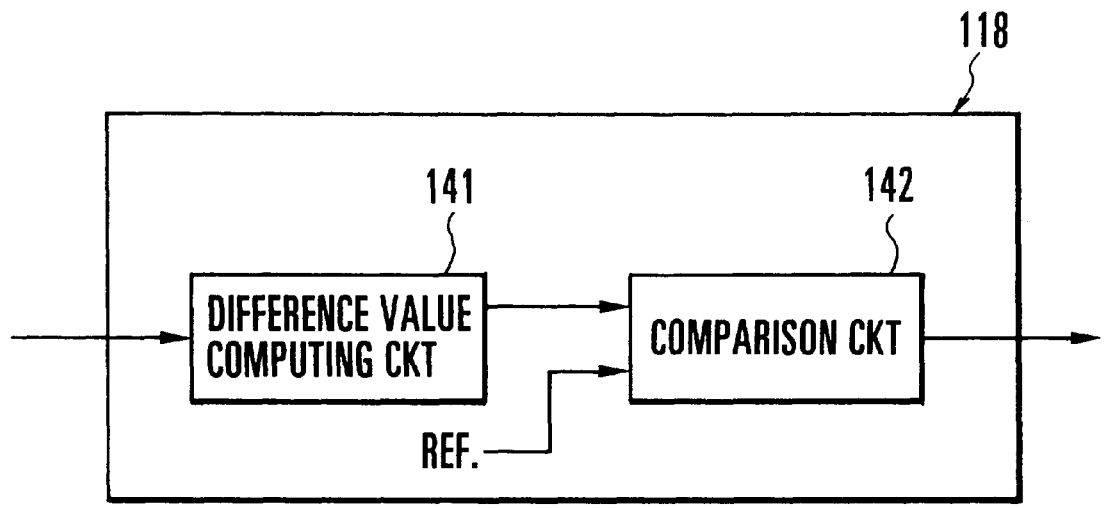
Figure 5A:
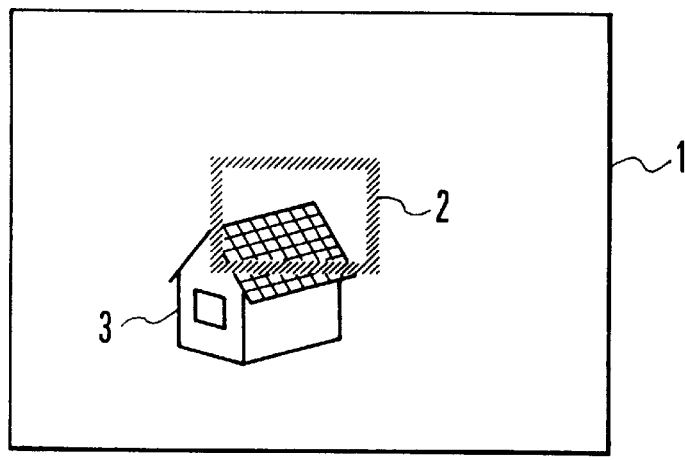
FIGS. 5(a), 5(b) and 5(c) show images picked up by the same automatic focus detecting device.
Figure 5B:
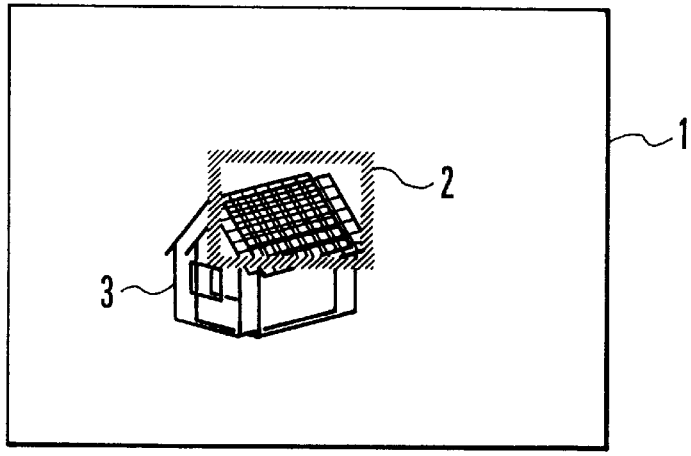
Figure 5C:
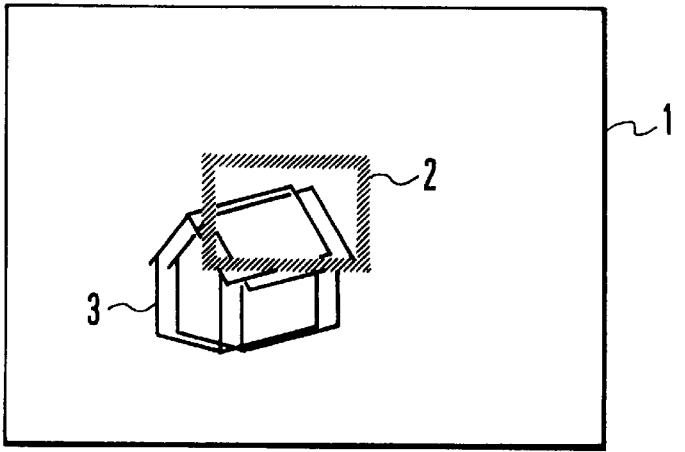
Figure 6A:
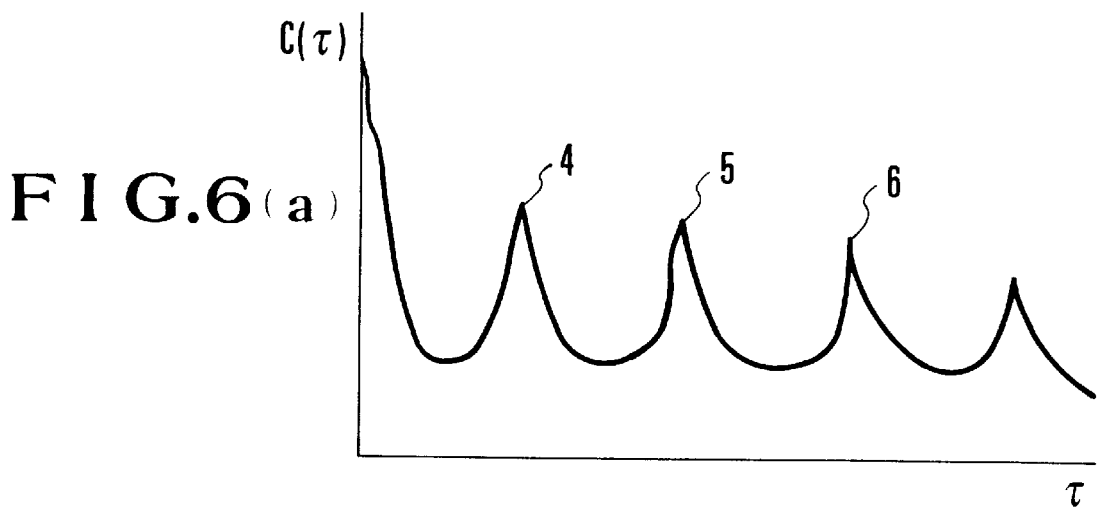
FIGS. 6(a), 6(b) and 6(c) show the autocorrelation functions of the images picked up by the same automatic focus detecting device.
Figure 6B:
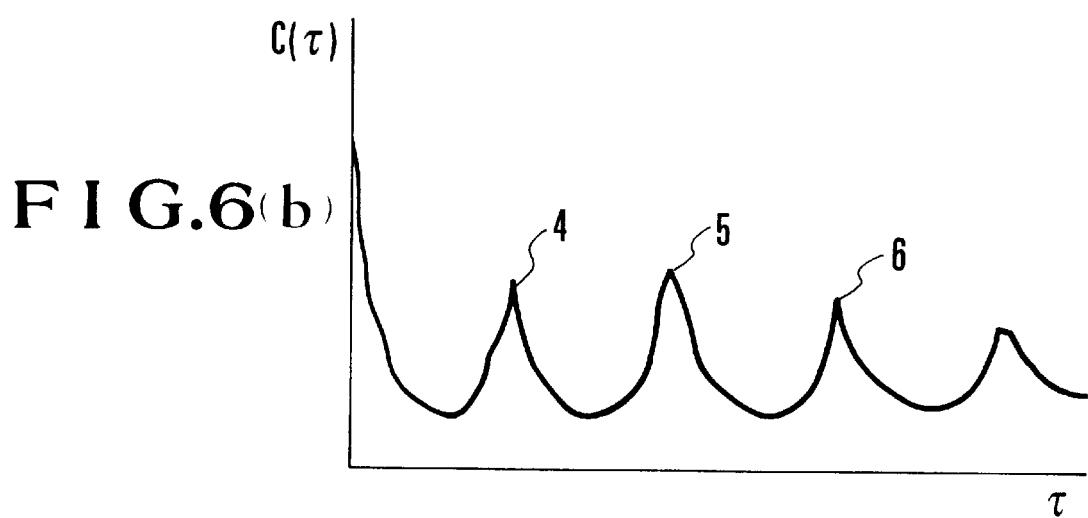
Figure 6C:
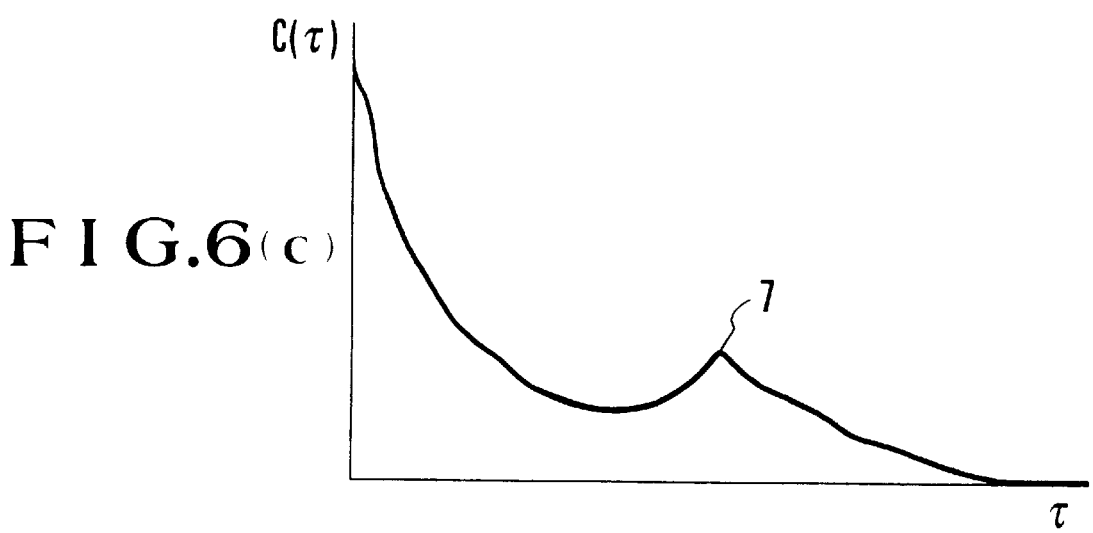
Figures 7, 8:
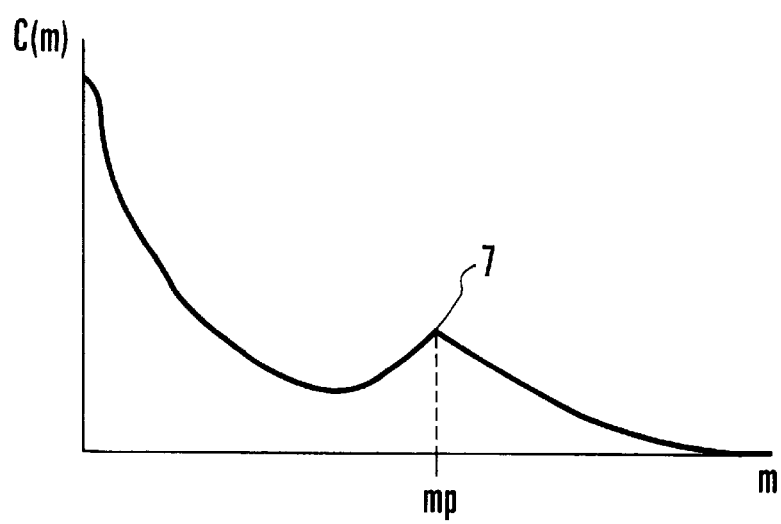
FIG. 7 shows the picture elements of an image signal obtained by the same device.
FIG. 8 is a characteristic diagram showing a correlation function computed by the same device.

An automatic focus detecting device which is arranged according to this invention as a first embodiment thereof is first described with reference to FIGS. 3 to 8. FIG. 3 is a block diagram showing the arrangement of the automatic focus detecting device. FIGS. 4(a) and 4(b) are block diagrams showing the arrangement of detection area discriminating means included in the device. FIGS. 5(a), 5(b) and 5(c) show images picked up. FIGS. 6(a), 6(b) and 6(c) show the autocorrelation functions of the picked-up images shown in FIGS. 5(a), 5(b) and 5(c). FIG. 7 shows the picture elements of an image signal. FIG. 8 shows the characteristic of a computed autocorrelation function.

The operation of the automatic focus detecting device of this kind is first described with reference to FIGS. 5(a), 5(b) and 5(c) as follows. A distance measuring frame 2 is set on a pickup image plane 1. Peaks are obtained by computing autocorrelation functions with respect to an image within the distance measuring frame 2. On the basis of the obtained peaks, focusing information is then obtained by detecting a peak which corresponds to a deviation from focus. In this instance, FIG. 5(a) shows an image which is in an in-focus state, while FIGS. 5(b) and 5(c) show images which are out of focus. FIGS. 6(a), 6(b) and 6(c) show autocorrelation functions corresponding respectively to FIGS. 5(a), 5(b) and 5(c). In the case of FIGS. 5(a) and 5(b), the images have clay tile roofs within the distance measuring frame 2. Therefore, the autocorrelation function which is shown in FIG. 6(a) and corresponds to the in-focus image shown in FIG. 5(a) has a plurality of peaks 4, 5 and 6 which periodically appear therein according to a cycle in which the clay tiles are arranged.

The autocorrelation function which is shown in FIG. 6(b) and corresponds to the out-of-focus image of FIG. 5(b) also has peaks 4, 5 and 6 periodically appearing therein. Therefore, it is impossible to detect any peak position that actually corresponds to a focus deviation.

In view of this problem, the first embodiment is provided with detection area discriminating means which is arranged to find if the contour part of an image and its peripheral part are an image area which is suited for detecting the focusing information. The provision of the detection area discriminating means enables the device to detect the contour part of an object of shooting and to compute the autocorrelation function on the basis of image data which represents a part around the contour part of the image detected.

In the case of the first embodiment, as shown in FIG. 3, an optical image of an object of shooting is formed on the image pickup plane of an image sensor 112 by a phototaking optical system 111. The optical image is photoelectrically converted into an electrical signal. The electrical signal is inputted to a sample-and-hold circuit 113. The sample-and-hold circuit 113 then outputs an image signal corresponding to the electrical signal. The image signal is inputted to a processing circuit 114 for color separation and gamma conversion processes.

A matrix circuit 115 and an A/D (analog-to-digital) converter 116 are connected to the processing circuit 114. The image signal which has been processed in the form of an analog signal by the processing circuit 114 is inputted to the matrix circuit 115 and also to the A/D converter 116 to be converted into a digital signal. The digital signal thus obtained is inputted to a signal level deciding circuit 117 to find if the digital image signal has a predetermined level. After that, the image signal is inputted to a detection area discriminating means 118.

The detection area discriminating means 118 consists of a contour detecting circuit 131 and a contour and peripheral area selecting circuit 132 which are series-connected to each other as shown in FIG. 4(a). A contour part and its peripheral part of a picked-up image are discriminated from other parts as a focusing information detection area by the detection area discriminating means 118.

The detection area thus discriminated is set by a detection area setting means 119, which then outputs a setting signal. The setting signal is inputted to a correlation computing element 120. The correlation computing element 120 computes an autocorrelation function on the basis of image data of the contour part and its peripheral part set by the detection area setting means 119. A signal indicative of the computed autocorrelation function is then inputted to a focusing information detecting circuit 121, which then outputs a focusing signal. The focusing signal is inputted to a lens driver 122 to actuate the lens driver 122. With the lens driver 122 thus actuated, focusing control is performed over the phototaking optical system 111.

The detection area discriminating means 118 in the first embodiment is formed by series-connecting a difference value computing circuit 141 and a comparison circuit 142 to each other as shown in FIG. 4(b) and is arranged to detect the contour part and its peripheral part by computing a difference value and by comparing the result of computation with a reference value. Thus, the detection area discriminating means 118 obtains a difference value signal Y(i,j) on the basis of the image signal X(i,j) obtained from the image sensor 112, by carrying out computation according to a formula (3), and discriminates a detection area from other areas by setting a threshold value on the basis of the difference value signal Y(i,j). In this formula, "i" represents a coordinate in the horizontal direction and "j" a coordinate in the vertical direction. The formula (3) is shown below:

$$Y(i,j) = \frac{1}{8} \sum_{a=-1}^{1} \sum_{b=-1}^{1} ((X(i,j) - X(i+a, j+b)) \quad (3)$$

Next, in the case of the first embodiment, the coordinates of the contour part of the image are computed as follows: A maximum value Ymax of the absolute value |Y(i,j)| of the difference value signal Y(i,j) is obtained. With the maximum value Ymax then used as a reference value, the threshold value Yth is obtained as Yth=0.7 Ymax. The coordinates (ie, je) of the value Y(i,j) within a range wherein the value |Y(i,j)| is smaller than the threshold value Yth are obtained. Then, a range within which the autocorrelation function is to be computed is decided by using the amount of deviation kmax of picture elements which is determined according to the width of the maximum blurred value of the image (inferred to be a maximum value). In this instance, a range of plus-and-minus kmax in the horizontal direction with respect to the coordinates (ie, je) considered to represent the contour part is set as a focusing information detection area.

The autocorrelation function C(τ) is expressed by a formula (4) with the original signal assumed to be f(t) and the range of data used for distance measurement to be T. Since the actual computing operation is carried out on dispersive data outputted from the image sensor 112, the original signal f(t) can be expressed, by using coordinates obtained on the image pickup plane, as X(i,j). With the original signal expressed as X(i,j), the autocorrelation function C(m,n) can be expressed by a formula (5). These formulas are shown below:

$$C(\tau) = \frac{1}{T} \int_0^T f(t) \cdot f(t+\tau) dt \quad (4)$$

-continued $$C(m, n) = \frac{1}{I \cdot J} \sum_{i=1}^{I} \sum_{j=1}^{J} X(i, j) \cdot X(i+m, j+n) \quad (5)$$

In Formula (5), "I" represents the number of picture elements in the horizontal direction of the distance measuring frame and "J" represents the number of picture elements in the vertical direction of the distance measuring frame. The relation between X(i,j) and X(i+m, j+n) is as shown in FIG. 7. In Formula (5), "m" and "n" are in a fixed relation. If "m" and "n" are functions of "k", "C(m,n)" can be expressed as C(k) as the function of a variable k. If "n" is zero, the "C(k)" becomes equal to a value obtained by replacing the continuous variable τ of the formula (4) with the dispersive variable k. Further, while the formula (5) represents a correlation between two points, i.e., a secondary correlation function, it is possible to use a correlation function between three points as expressed by a formula (6) below:

$$C_3(m, n, p, q) = \frac{1}{I \cdot J} \sum_{i=1}^{I} \sum_{j=1}^{J} X(i, j) \cdot X(i+m, j+n) \cdot X(i+p, j+q) \quad (6)$$

In Formula (6), like in the case of Formula (5), if m, n, p and q are functions of the variable k, "$C_3(m,n,p,q)$" can be expressed as a function $C_3(k)$ of the variable k.

In the first embodiment, the autocorrelation function C(m) is computed for the focusing information detection area set in the manner described above. The autocorrelation function thus obtained is shown in FIG. 8. In FIG. 8, reference numeral 7 denotes a peak which corresponds to the amount of focus deviation. The value mp of "m" which is then obtained indicates the distance of image deviation obtained on the image sensor 112.

In accordance with the arrangement of the first embodiment, the peak position of focus deviation can be accurately detected even if a periodic pattern is included in the image of an object of shooting. In addition to that, since the correlation computing operation is carried out only on an effective part of the image signal, the focus detecting computing operation can be speedily carried out.

While the first embodiment is described above as in a case where the value "n" in the formula (5) is zero, the same concept applies also to a case where the other value "m" is zero. In this case, a range extending plus-and-minus kmax in the vertical direction with respect to the coordinates (ie, je) found to represent a contour part can be set as the focusing information detection area. If neither "m" nor "n" is zero, both "m" and "n" are handled as the functions of "k". In that case, the focusing information detection area is set at a range obliquely extending plus-and-minus kmax in a direction defined by the relation between "m" and "n" with the coordinates (ie, je) which are found to represent the contour part located in the center of the range. The amount of focus deviation in the oblique direction can be thus detected.

Further, the focus detecting method of the first embodiment is applicable also to the cubic autocorrelation function expressed by the formula (6). It is applicable to various correlation computations, such as a method of obtaining a correlation by addition as expressed by the following formula (7):

$$Cx(m, n) = \frac{1}{I \cdot J} \sum_{i=1}^{I} \sum_{j=1}^{J} (X(i, j) + X(i+m, j+n)) \quad (7)$$

While the correlation of the image signal X(i,j) from the image sensor 112 is obtained by the formulas (5), (6) and (7), the first embodiment may be modified, for example, to compute the autocorrelation function for a signal obtained from a difference of the image signal X(i,j) or a signal obtained through a low-pass filter instead of using the image signal X(i,j). The advantage of the first embodiment can be enhanced by such a modification.

(Second Embodiment)

Figure 9:
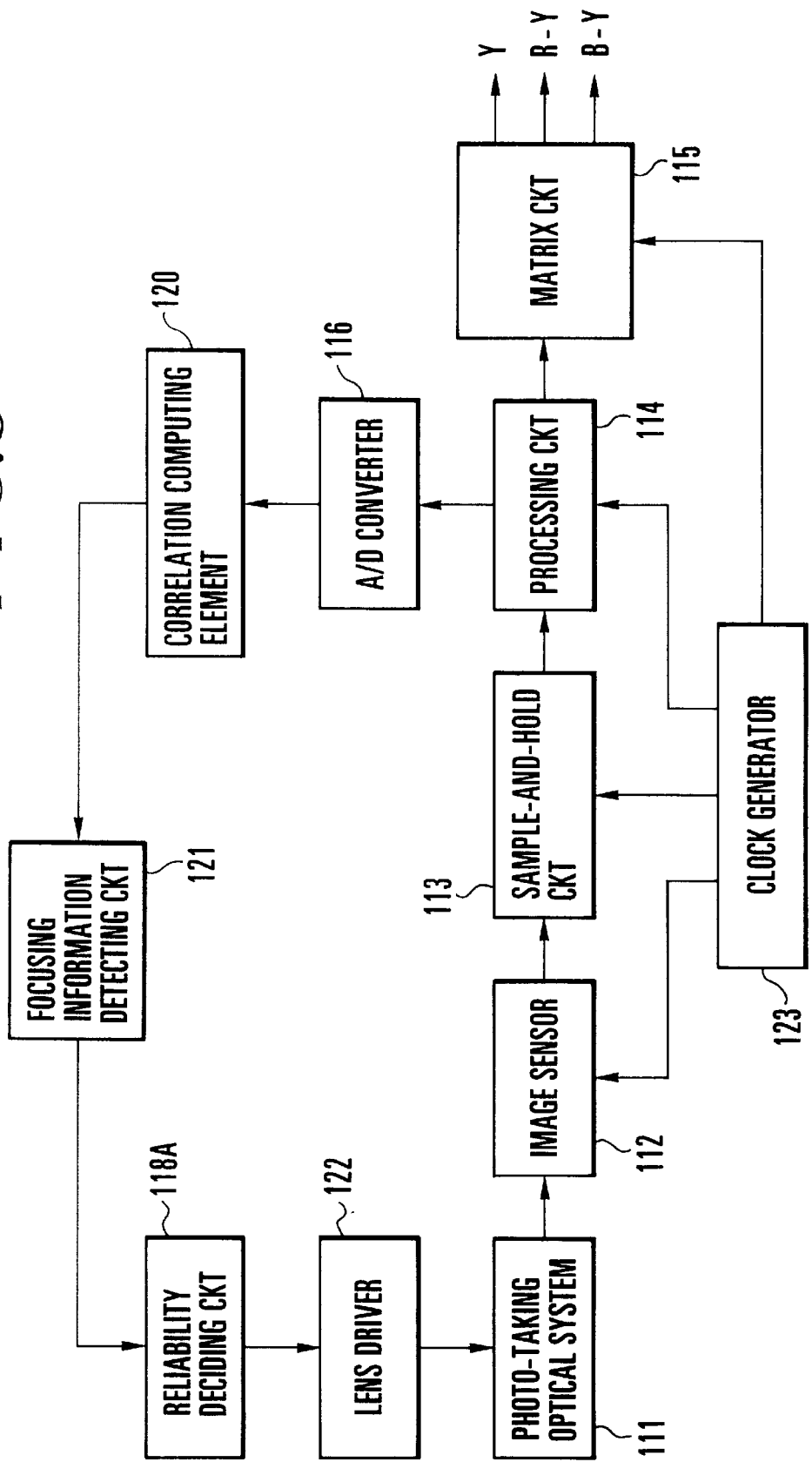
FIG. 9 is a block diagram showing the arrangement of an automatic focus detecting device arranged as a second embodiment of this invention.
Figure 10A:
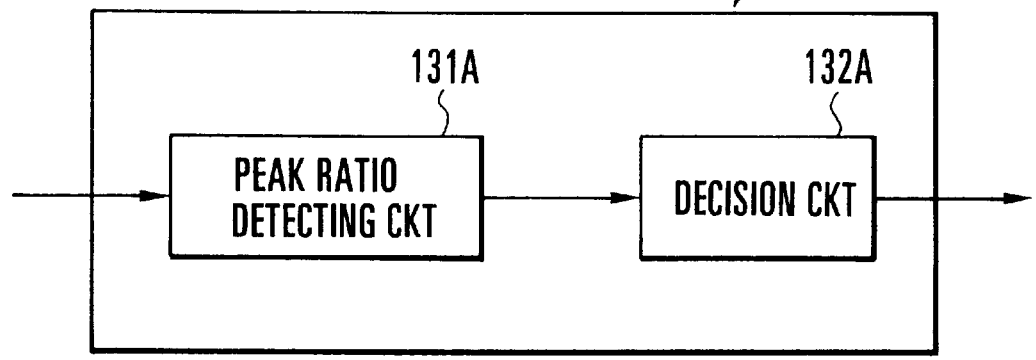
FIGS. 10(a), 10(b) and 10(c) are block diagrams showing the arrangement of a reliability deciding circuit included in the same device.
Figure 10B:
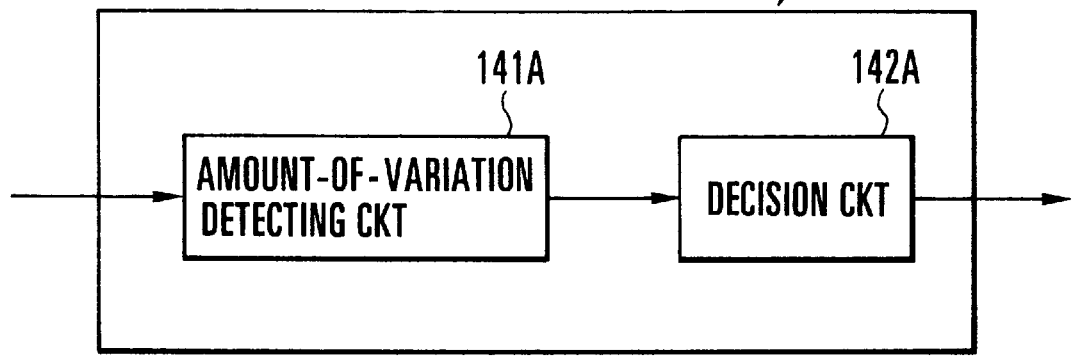
Figure 10C:
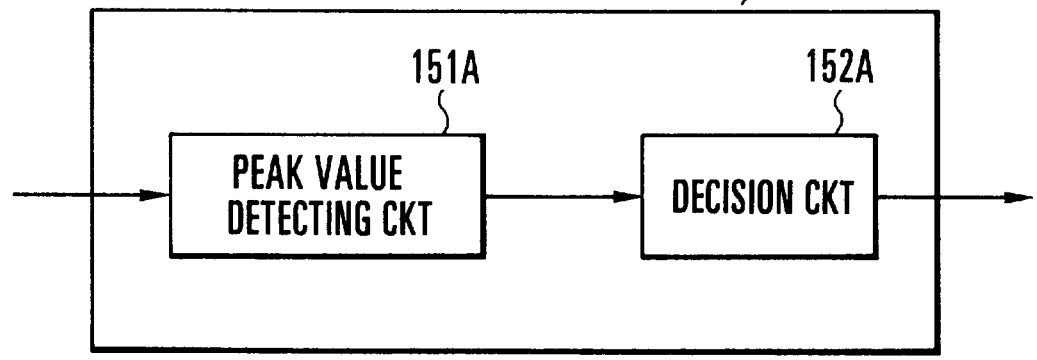
Figure 11:
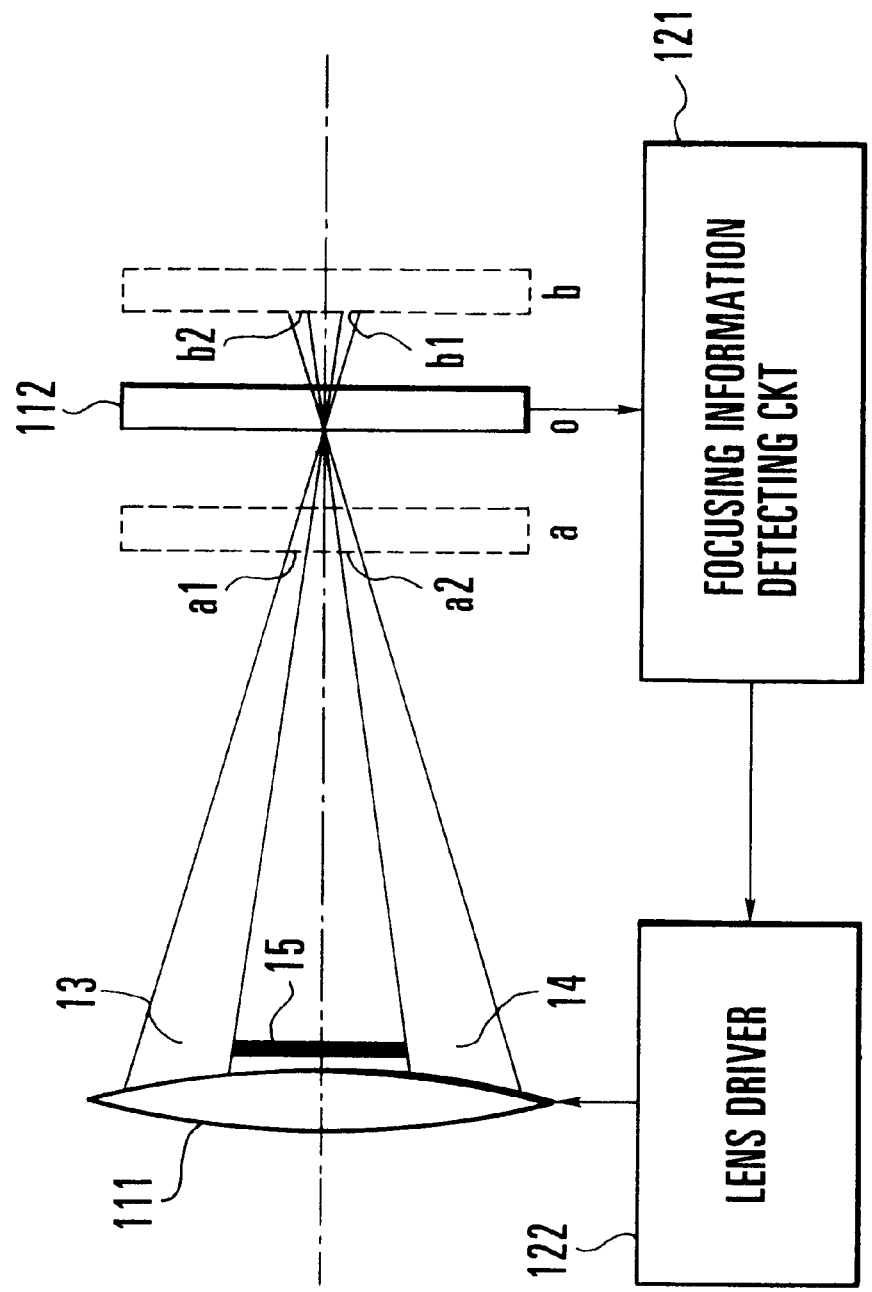
FIG. 11 shows the arrangement of a photo-taking optical system and an image sensor of the same device.
Figure 12:
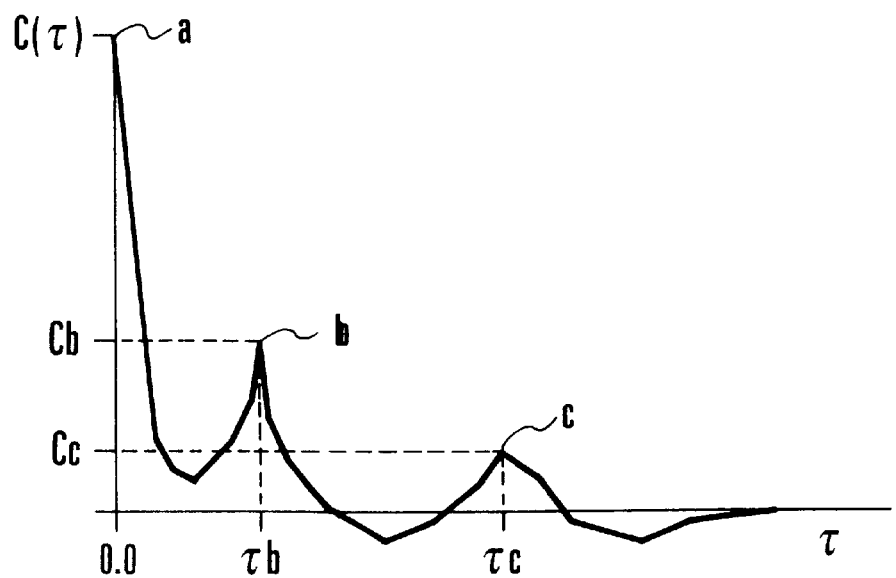
FIG. 12 is a characteristic diagram showing by way of example an autocorrelation function obtained by the same device.
Figure 13:
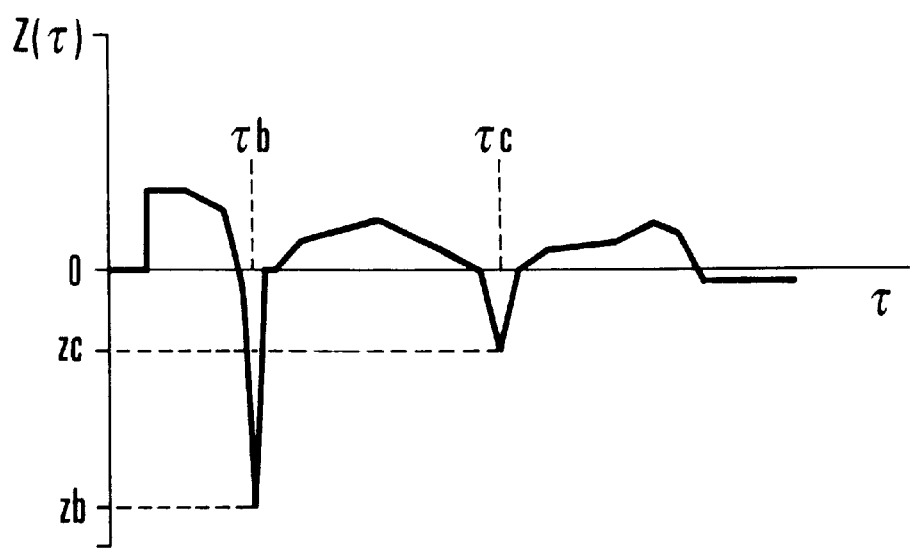
FIG. 13 is a characteristic diagram showing the differentiated values of the autocorrelation function shown in FIG. 12.

A second embodiment of this invention is described with reference to FIGS. 9 to 13 as follows: FIG. 9 shows in a block diagram the arrangement of an automatic focus detecting device arranged as the second embodiment of this invention. FIGS. 10(a), 10(b) and 10(c) are block diagrams showing the arrangement of the reliability deciding circuit of the device. FIG. 11 shows the arrangement of a photo-taking optical system and an image sensor. FIG. 12 is a characteristic diagram showing by way of example an autocorrelation function computed in the second embodiment. FIG. 13 is a characteristic diagram showing the differentiated value of the autocorrelation function shown in FIG. 12. In each of the drawings, the same parts as those of the first embodiment are indicated by the same reference numerals.

The second embodiment differs from the first embodiment in the following point: the detection area discriminating means 118, the detection area setting means 119 and the signal level deciding circuit 117 are removed from the arrangement of FIG. 3, and a reliability deciding circuit 118A is arranged between the lens driver 122 and the focusing information detecting circuit 121 to decide reliability. The reliability deciding circuit 118A includes a series-connected circuit which consists of a peak ratio detecting circuit 131A and a decision circuit 132A as shown in FIG. 10(a), a series-connected circuit which consists of an amount-of-variation detecting circuit 141A and a decision circuit 142A as shown in FIG. 10(b) and a series-connected circuit which consists of a peak value detecting circuit 151A and a decision circuit 152A as shown in FIG. 10(c).

The peak ratio detecting circuit 131A is arranged to detect a ratio in height between a plurality of peaks of correlation computation output values. The decision circuit 132A is arranged to determine the reliability of the peaks by comparing with a reference value the ratio in height of the peaks detected by the peak ratio detecting circuit 131A. The amount-of-variation detecting circuit 141A is arranged to detect the amount of variation in the neighborhood of each of the plurality of peaks of the correlation computation output values. The decision circuit 142A is arranged to determine the reliability of the peaks according to the magnitude of the amount of variation in the neighborhood of each peak detected by the amount-of-variation detecting circuit 141A. The peak value detecting circuit 151A is arranged to detect the values of peaks of the correlation computation output values. The decision circuit 152A is arranged to determine the reliability of the peaks according to the magnitude of the values of peaks detected by the peak value detecting circuit 151A.

Referring to FIG. 11, in the case of the second embodiment, the optical image of an object of shooting obtained through the photo-taking optical system 111 is divided to a first pupil position 13 and a second pupil position 14 by a light blocking plate 15 disposed in rear of the photo-taking optical system 111, and is then formed into an image on the image sensor 112 disposed in the rear of the light blocking plate 112. In an in-focus state, a light flux which passes through the first pupil position 13 and another light flux which passes through the second pupil position are imaged in one and the same position on the image sensor 112, which is disposed in an in-focus position "o". If the image sensor 112 is disposed in a far focus position "a", the light flux passing through the first pupil position 13 is imaged in a position a1 and the flight flux passing through the second pupil position 14 in a position a2 in a somewhat blurred state.

Further, if the image sensor 112 is disposed in a near focus position "b", the light flux passing through the first pupil position 13 is imaged in a position b1 and the light flux passing through the second pupil position 14 in a position b2 also in a somewhat blurred state. In the case of the near focus position "b", the light fluxes are imaged by reversing the positional relation of the optical image which is obtained with the image sensor 112 in the far focus position "a". The image sensor 112 then outputs an image signal. The image signal is eventually inputted to the focusing information detecting circuit 121 which is arranged to detect focusing information. To the focusing information detecting circuit 121 is connected the lens driver 122 which is arranged to drive the photo-taking optical system 111.

In the case of the second embodiment, the autocorrelation function of the image signal obtained from an image formed on the image sensor 112 is computed by the correlation computing element 120. The focusing information detecting circuit 121 then finds whether or not an in-focus state is obtained and, if not, infers the amount of deviation from an in-focus state.

The autocorrelation function $C(\tau)$ is expressed by the formula (4), as mentioned in the foregoing, with the original signal assumed to be f(t) and the range of data to be used for distance measurement to be T. FIG. 12 shows one example of the autocorrelation function $C(\tau)$. The autocorrelation function $C(\tau)$ has two peaks b and c. The second embodiment is arranged to compare the peaks b and c at the peak ratio detecting circuit 131A and decides the reliability by selecting the peak b, because the peak b has a larger correlation value than the other peak c.

In the case of the second embodiment, a ratio Rc between the correlation value of the peak b which has the largest correlation value and that of the peak c which has the second largest correlation value is first obtained by a formula (8) which is as follows:

$$Rc = C(\tau b)/C(\tau c) \quad (8)$$

The ratio Rc between the correlation values are always larger than "1". However, it comes closer to "1" as the reliability becomes lower.

Next, the amounts of variation of the correlation values in the peaks b and c are obtained by the amount-of-variation detecting circuit 141A. Then, a ratio Rz between these two amounts of variation is obtained.

$$Y(\tau) = C(\tau)d/d\tau \quad (9)$$

$$Z(\tau) = Y(\tau)d/d\tau \quad (10)$$

$$Rz = Z(\tau b)/Z(\tau c) \quad (11)$$

In Formulas (9) to (11) shown above, "$Y(\tau)$" represents a value obtained by differentiating the correlation value $C(\tau)$, and "$Z(\tau)$" represents a value obtained by differentiating "$Y(\tau)$" (see FIG. 13). The ratio Rz is normally larger than "1" but becomes smaller than "1" when the reliability decreases.

Therefore, in the case of the second embodiment, a reference value is set, for example, at "2" and, the peak b is considered to have a sufficient reliability when both the ratios Rc and Rz are larger than "2" (Case 1). In a case where one of the ratios Rc and Rz is larger than "2" while the other is smaller than "2", the reliability is considered to be somewhat low (Case 2). If both the ratios Rc and Rz are smaller than "2", the peak is considered to have little reliability (Case 3).

In Case 1, the position τb of the peak b is processed as an amount of deviation. In Case 2, the position τb of the peak b is processed as an amount of deviation if the value Cb is found to be equal to or above the reference value by using the peak value detecting circuit 151A and the decision circuit 152A or processed in the same manner as in the case 3 if the value Cb is less than the reference value. In Case 3, a high-pass filter is applied to the signal X(t) and the reliability is again decided by again computing the correlation function. If the result of the second reliability deciding process still shows the Case 3, the reliability deciding process is carried out by computing the autocorrelation function with the characteristic of the high-pass filter changed. The same process may be repeated until the result of decision is not Case 3. However, if the processing time becomes too long, the reliability deciding process may be brought to an end halfway by considering it to be impossible.

In the second embodiment, the reliability deciding circuit 118A thus decides or determines the reliability of peak positions according to the states of a plurality of peak values of the autocorrelation function. Then, the detection area setting means correctly sets a focusing information detection area on the basis of the result of the decision made by the circuit 118A.

(Third Embodiment)

Figure 14:
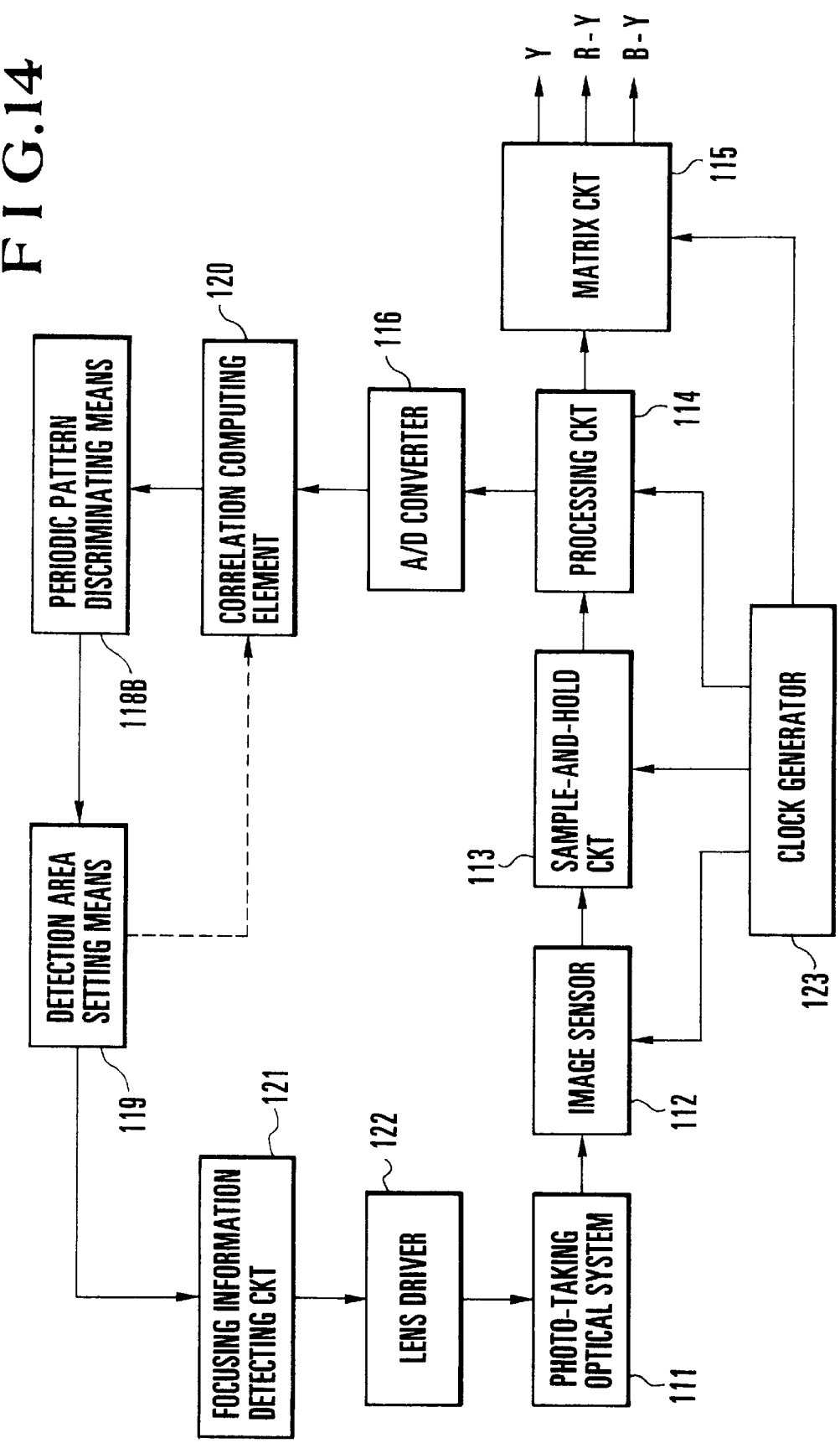
FIG. 14 is a block diagram showing the arrangement of an automatic focus detecting device arranged as a third embodiment of this invention.
Figure 15:
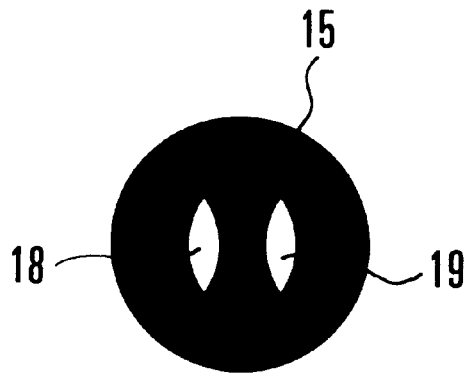
FIG. 15 is a front view showing a light blocking plate included in the same device.
Figures 16A, 16B:
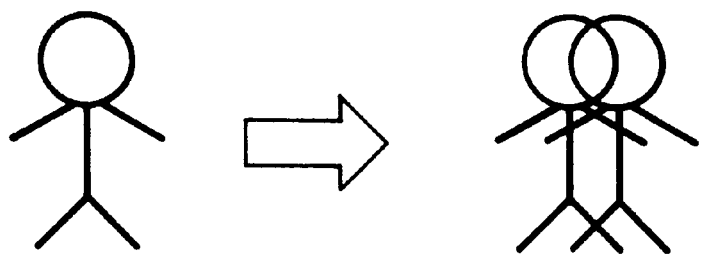
FIGS. 16(a) and 16(b) each show an optical image of an object of shooting obtained by using the light blocking plate shown in FIG. 15.
Figure 17A:
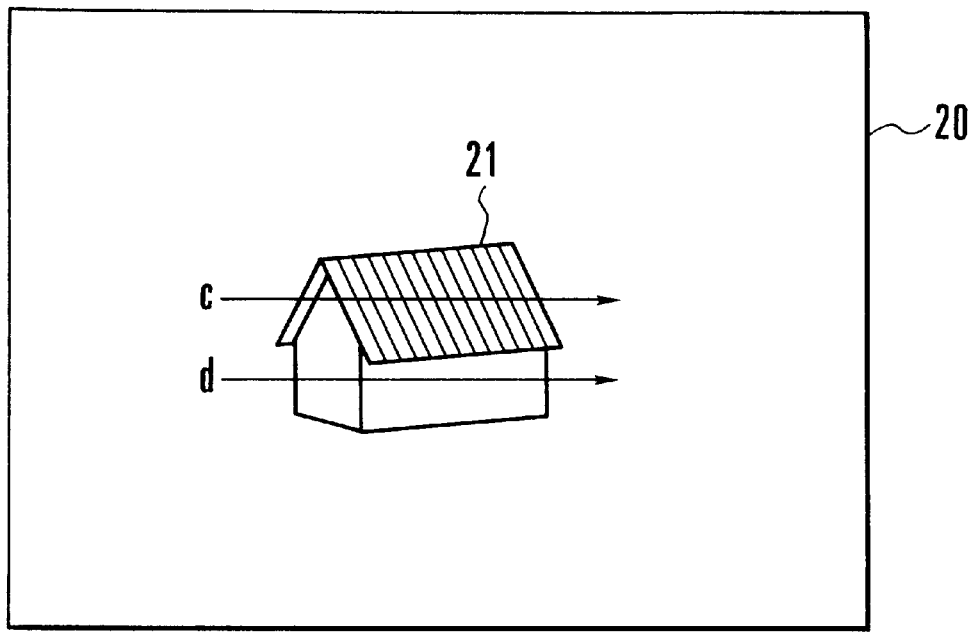
FIGS. 17(a) and 17(b) show images including a periodic pattern obtained by the same device.
Figure 17B:
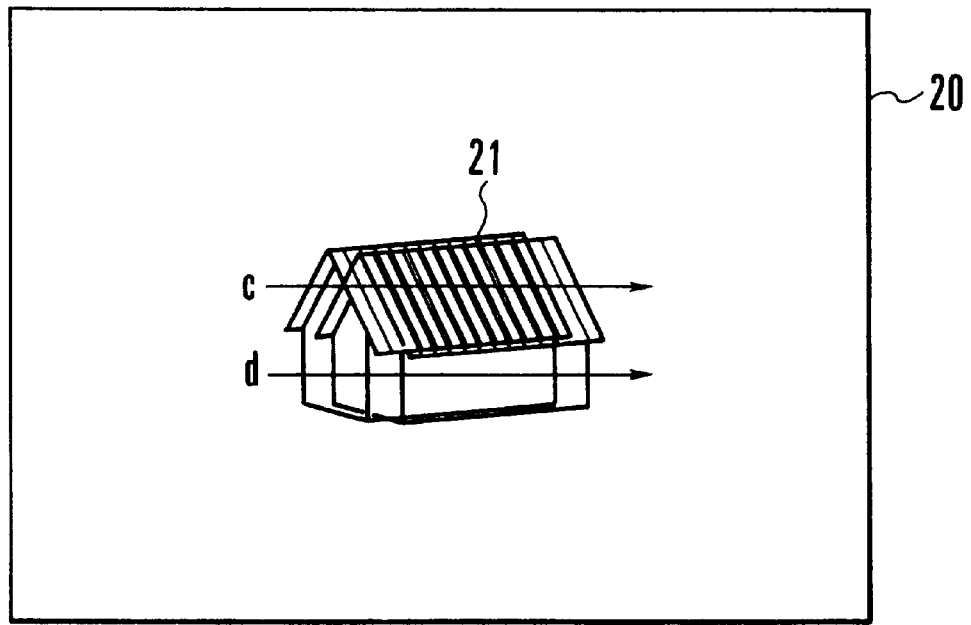

A third embodiment of this invention is next described with reference to FIG. 14 to FIGS. 18(a) to 18(d) as follows: FIG. 14 is a block diagram showing the arrangement of an automatic focus detecting device arranged as the third embodiment of this invention. FIG. 15 is a front view of a light blocking plate. FIGS. 16(a) and 16(b) show the optical images of an object of shooting obtained with the light blocking plate of FIG. 15 being used. FIGS. 17(a) and 17(b) show images having a periodic pattern. FIGS. 18(a) to 18(d) show the characteristics of the autocorrelation function corresponding to FIGS. 17(a) and 17(b).

In these drawings which relate to the third embodiment, parts which are the same as those of the first embodiment are indicated by the same reference numerals.

The third embodiment differs from the first embodiment described in the foregoing in the following points: periodic pattern discriminating means 118B is arranged in place of the detection area discriminating means 118 which is shown in FIG. 3. A correlation computing element 120 is arranged before the periodic pattern discriminating means 118B in place of the signal level deciding circuit 117.

In the case of the third embodiment, a photo-taking optical system 111 which is similar to the photo-taking optical system of the second embodiment is used. The third embodiment includes a light blocking plate 15 which is provided with aperture parts 18 and 19 as shown in FIG. 15. In an in-focus state, light fluxes passing through the aperture parts 18 and 19 are imaged at one point on the image sensor 112. In this case, like in the case of FIG. 11, the light flux passing through the aperture part 18 is imaged at a position a1 and the light flux passing through the other aperture 19 is imaged at a position a2 in a somewhat blurred state, if the image sensor 112 is located in a far focus position "a". If the image sensor 112 is located in a near focus position "b", the light flux passing through the aperture part 18 is imaged at a position b1 and the light flux passing through the aperture part 19 at a position b2 also in a somewhat blurred state by reversing the positional relation of the optical image obtained in the case of the far focus position "a". The actual optical image becomes as shown in FIG. 16(a) in the in-focus state. If the image sensor 112 is in the front focus position, there is obtained a double line blurred state with two optical images overlapped as shown in FIG. 16(b). The double line blurred state is obtained also when the image sensor 112 is in the far focus position.

When the autocorrelation function C(m,j) is computed in accordance with the formula (5) by taking out one line portion of the image signal obtained from the image sensor 112 in the horizontal direction, the result of computation becomes as shown in FIG. 8 as mentioned in the foregoing. As indicated at a point mp in FIG. 8, in the autocorrelation function of a double line blurred image, a peak appears at a part other than the part of m=0. This peak position corresponds to the amount of deviation of the image and indicates that the image is deviating in the horizontal direction as much as mp picture elements.

The operation of the embodiment to be performed in a case where an image includes a periodic pattern as shown in FIGS. 17(a) and 17(b) is described as follows: in FIGS. 17(a) and 17(b), reference numeral 20 denotes a distance measuring frame. An image 21 is formed within the distance measuring frame on the image sensor 112.

FIG. 17(a) shows an image obtained in an in-focus state, while FIG. 17(b) shows an image obtained either in a near-focus state or in a far-focus state. For each of these images, a line c represents a line having a periodicity, and a line d represents a line having no periodicity.

Figure 18A:
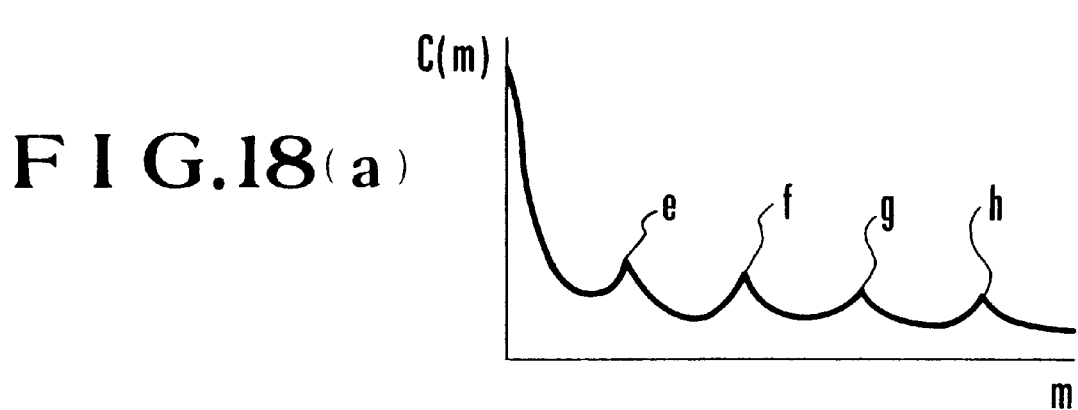
FIGS. 18(a), 18(b), 18(c) and 18(d) are characteristic diagrams showing by way of example autocorrelation functions obtained by the same device.
Figure 18B:
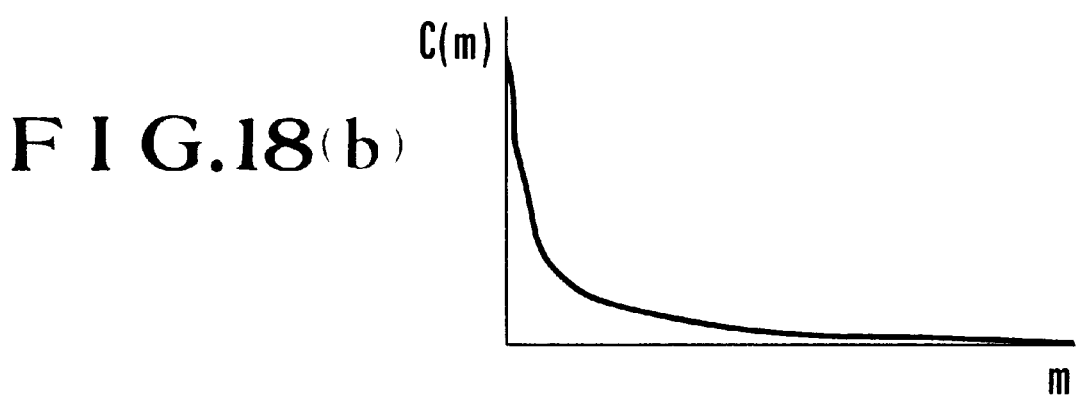

When autocorrelation functions are computed on the lines c and d in FIG. 17(a), the results of computation become respectively as shown in FIGS. 18(a) and 18(b). The autocorrelation function on the periodic line c has, despite of the in-focus state of the image, four peaks e to h, which make detection of focusing information hardly possible. However, in cases where a plurality of peaks appear on an axis m at equal intervals like in this case, the image can be judged to have a periodic pattern. In such a case, the third embodiment does not use the autocorrelation function of such a line for detecting the focusing information and uses, for this purpose, image data of a line on which no peaks appear at equal intervals, like the line d.

Figure 18C:
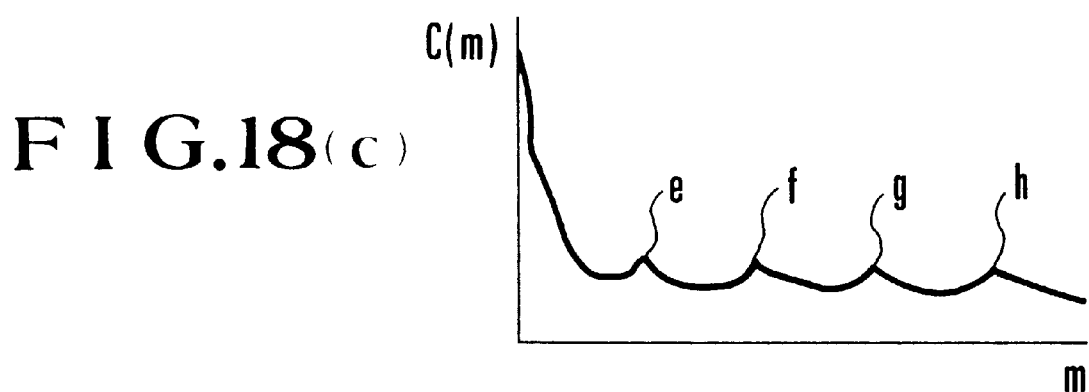
Figure 18D:
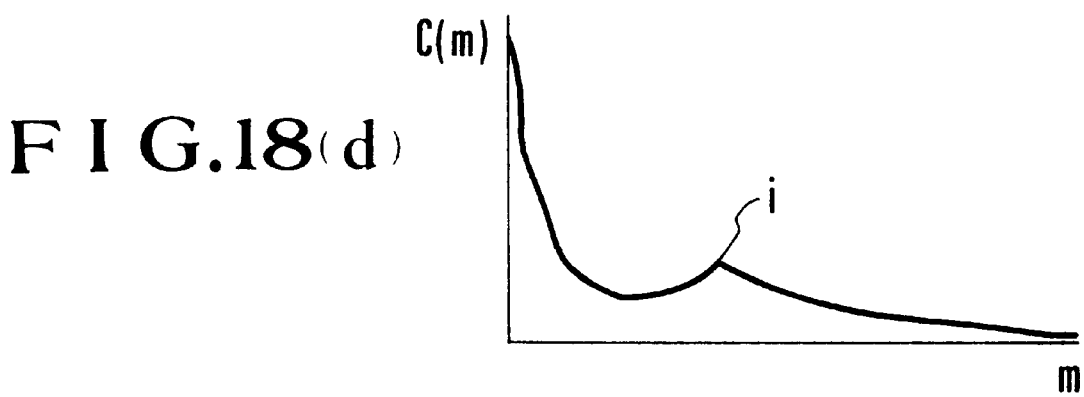

Further, when the autocorrelation function is obtained on the line c in FIG. 17(b), the result becomes as shown in FIG. 18(c). When the autocorrelation function is obtained on the other line d in FIG. 17(b), the result becomes as shown in FIG. 18(d). In the autocorrelation function shown in FIG. 18(d), there appears a peak i which corresponds to a focus deviation. In the case of FIG. 18(c), however, there appear periodic peaks, which prevent a discrimination of any peak that is caused by a focus deviation.

The third embodiment is thus arranged such that, when a line is found to have some periodicity by computing the autocorrelation function on the line, the focusing information is detected from image data of some other line that has no periodicity. Therefore, the focusing information can be accurately detected even from any image that includes a periodic pattern.

The focusing information detecting accuracy can be further enhanced by arranging the embodiment to compute the autocorrelation function of each of a plurality of lines having no periodicity and to obtain an average value of the autocorrelation functions thus obtained.

(Fourth Embodiment)

Figure 20:
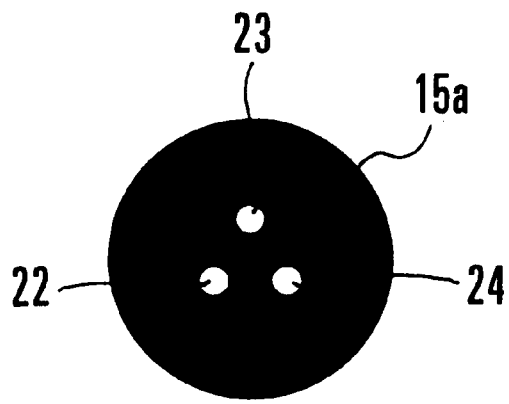
FIG. 20 is a front view showing a light blocking plate included in the same device.
Figures 21A, 21B:
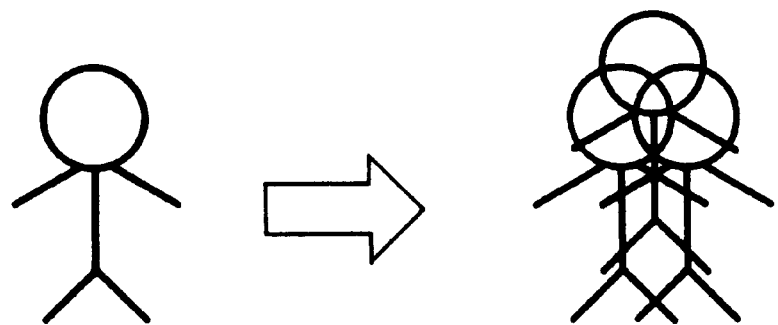
FIGS. 21(a) and 21(b) each show an optical image of an object of shooting obtained by using the light blocking plate shown in FIG. 20.
Figure 22A:
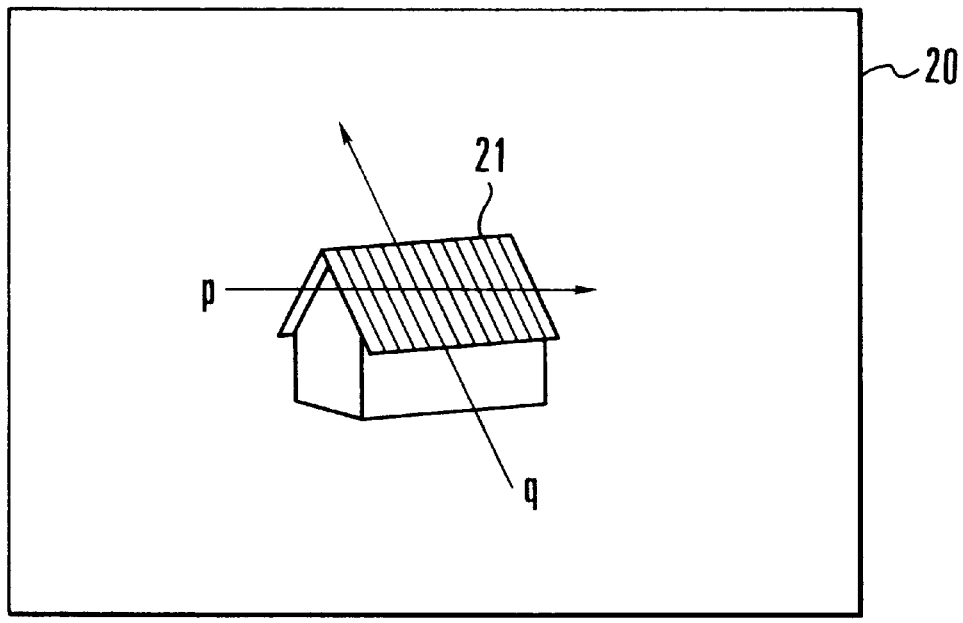
FIGS. 22(a) and 22(b) show images obtained by using the light blocking plate shown in FIG. 20.
Figure 22B:
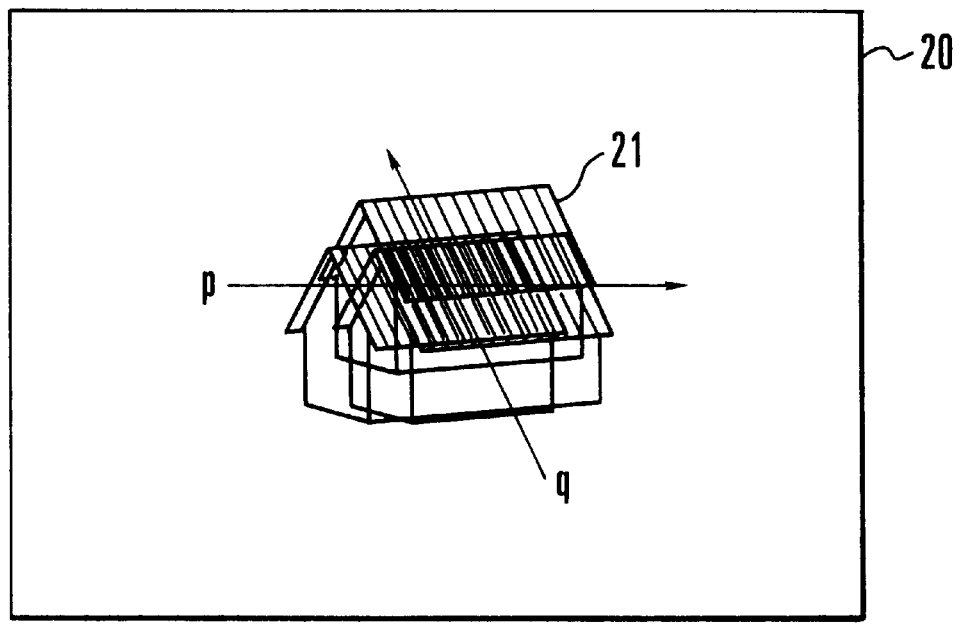

A fourth embodiment of this invention is next described with reference to FIG. 19 to FIGS. 23(a) to 23(d). FIG. 19 is a block diagram showing the arrangement of essential parts of an automatic focus detecting device arranged according to this invention as the fourth embodiment thereof. FIG. 20 is a front view of a light blocking plate. FIGS. 21(a) and 21(b) show optical images of an object of shooting obtained with the light blocking plate of FIG. 20 used. FIGS. 22(a) and 22(b) show images obtained with the light blocking plate of FIG. 20 used. FIGS. 23(a) to 23(d) are characteristic diagrams showing autocorrelation functions corresponding to FIGS. 22(a) and 22(b).

The fourth embodiment is arranged in the same manner as the third embodiment described above except that the arrangement of the detection area setting means of the fourth embodiment differs from that of the third embodiment. In the case of the fourth embodiment, the detection area setting means 119A is formed with a series-connected circuit consisting of a direction discriminating circuit 161A and a direction selecting circuit 162A. The light blocking plate 15a is provided with three aperture parts 22, 23 and 24. The direction discriminating circuit 161A is arranged such that, in the event of an image including a periodic pattern, the direction discriminating circuit 161A finds in which direction the periodicity of the pattern exists within the image plane, for example, in the horizontal direction or an oblique direction of the image plane. The direction selecting circuit 162A is arranged to select a direction in which there is no periodicity.

When the light blocking plate 15a is used, an optical image formed on the image sensor 112 becomes as shown in FIG. 21(a) or 21(b). FIG. 21(a) shows an optical image obtained in an in-focus state. In a case where the image sensor 112 is located in a front-focus or rear-focus position relative to the photo-taking optical system 111, an optical image is obtained in a state of having three optical images which correspond to the aperture parts 22, 23 and 24 imperfectly overlapping one another, as shown in FIG. 21(b). With the exception of these points, the fourth embodiment is identical with the third embodiment.

Figure 23A:
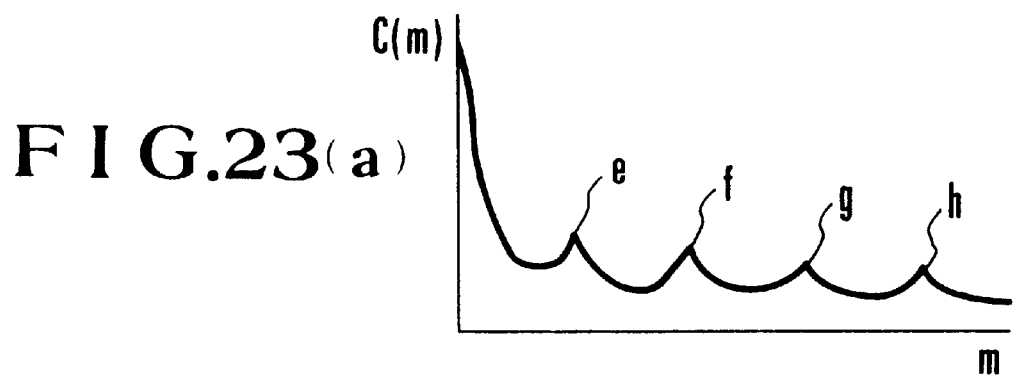
FIGS. 23(a), 23(b), 23(c) and 23(d) are characteristic diagrams showing examples of autocorrelation functions obtained by the same device.
Figure 23B:
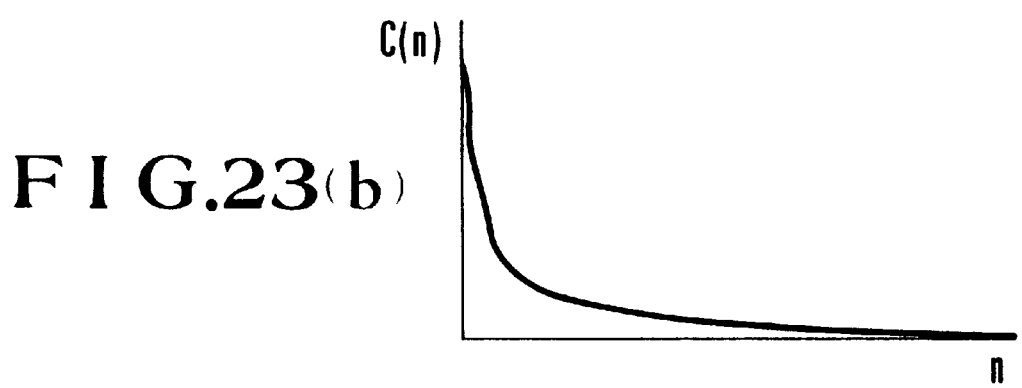

FIGS. 22(a) and 22(b) show images obtained from the image sensor 112 by using the light blocking plate 15a which is shown in FIG. 20. The autocorrelation function of image data on a line p shown in FIG. 22(a) has a plurality of peaks appearing at equal intervals as shown in FIG. 23(a). In this case, the focusing information cannot be detected because of the periodicity of the line. The autocorrelation function is computed, therefore, by taking out image data in the direction of a line q as shown in FIG. 22(a). Then, with a variable expressed as "n", the autocorrelation function becomes as shown in FIG. 23(b). The autocorrelation function thus obtained indicates an in-focus state as it neither has any plurality of peaks at equal intervals nor any peak caused by an image blur.

Figure 23C:
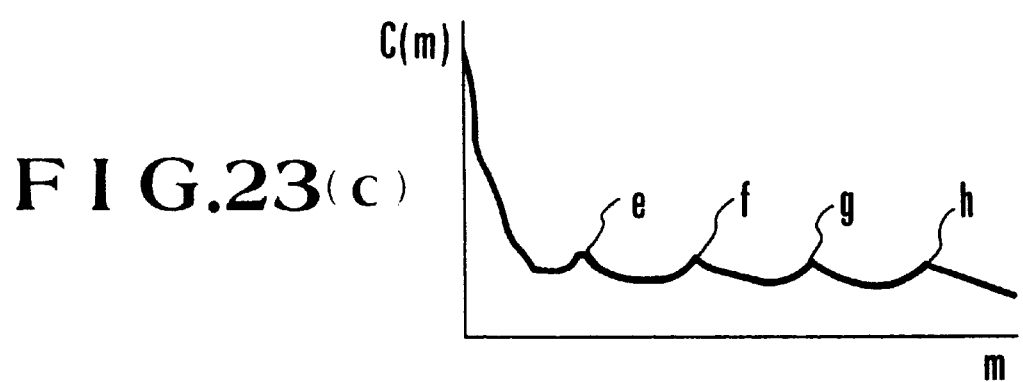
Figure 23D:
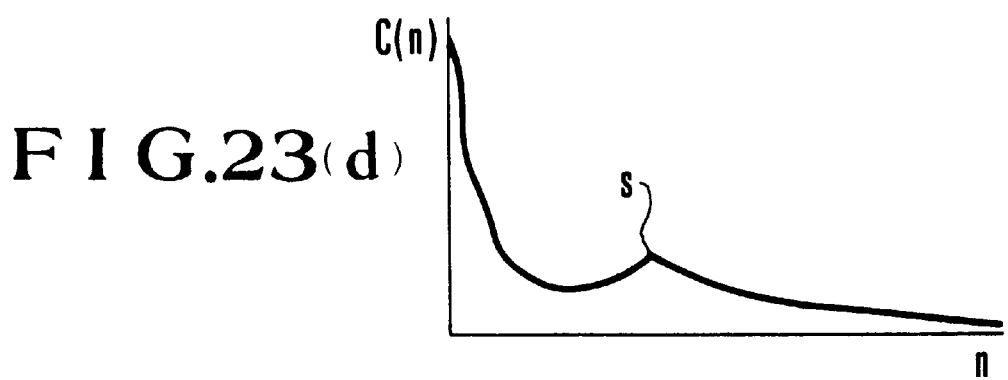

In the case of FIG. 22(b), since a plurality of peaks e to h appear at equal intervals in image data on a line p when an autocorrelation function is obtained as shown in FIG. 23(c), the line p is not usable in detecting the focusing information. Therefore, an autocorrelation function is computed by obtaining image data on another line q. Then, as shown in FIG. 23(d), periodic components disappear, and a peak corresponding to an amount of image deviation appears at a point s.

The fourth embodiment is thus arranged to compute the autocorrelation function along a line in a certain direction, such as the horizontal direction and, if a plurality of peaks appear at equal intervals, to judge that the image has periodicity in this direction. In that case, the fourth embodiment again computes the autocorrelation function along a line extending in another direction. This process is repeated until a direction in which no adverse effect of a periodic pattern appears in the autocorrelation function is found. Then, the focusing information is detected on the basis of the data of the autocorrelation function computed in that direction, so that the focusing information can be accurately detected even from an image having a periodic pattern.

The arrangement described above enables the fourth embodiment to correctly detect the focusing information without being affected by the presence of a periodic pattern even in the event of such an image that has a periodic pattern over the whole image plane.

(Fifth Embodiment)

Figure 25A:
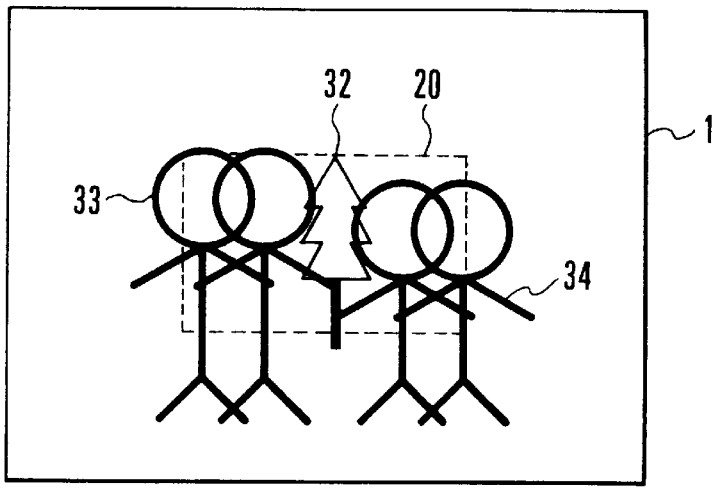
FIGS. 25(a), 25(b) and 25(c) show images of fields having far distance views and near distance views obtained by the same device.
Figure 25B:
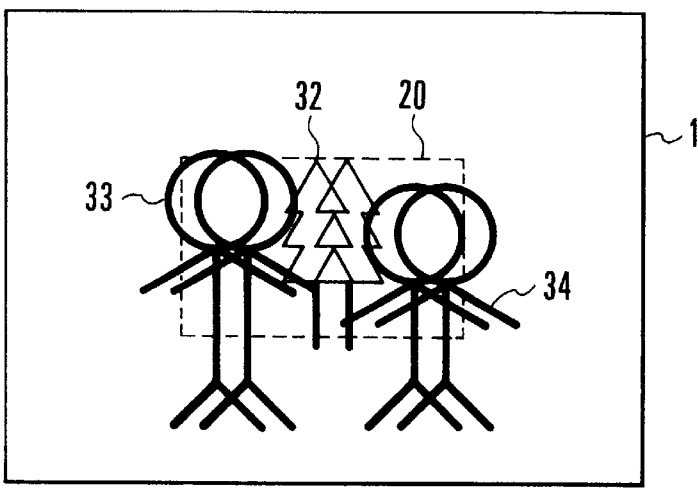
Figure 25C:
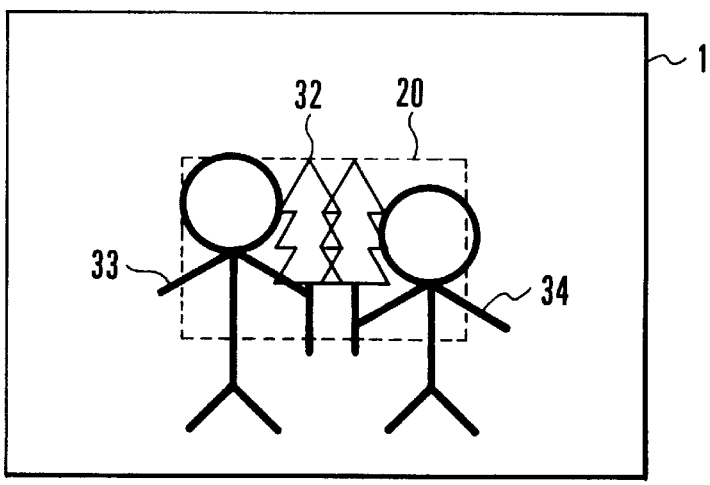
Figure 27A:
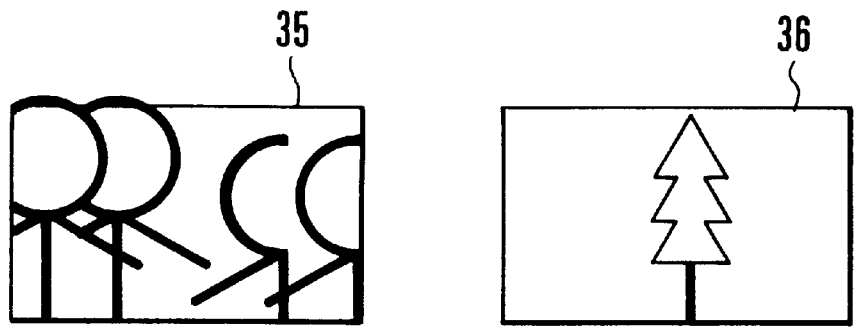
FIGS. 27(a), 27(b) and 27(c) show how images of far-distance and near-distance views are separated from each other by the same device.
Figure 27B:
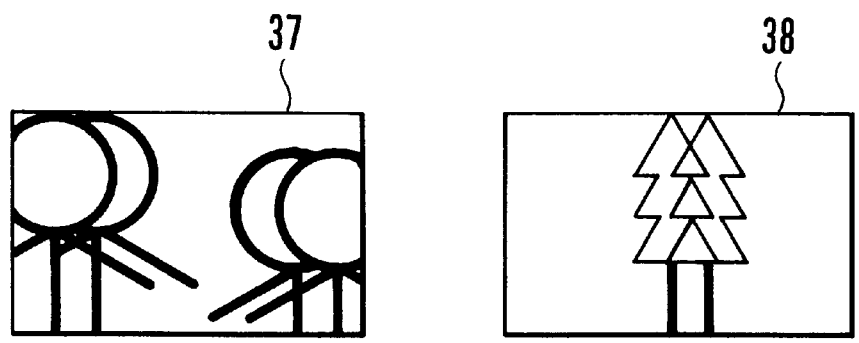
Figure 27C:
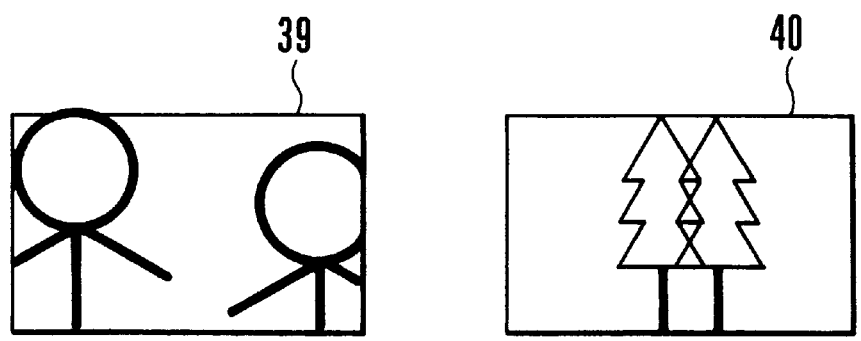

A fifth embodiment of this invention is described with reference to FIG. 24 to FIGS. 27(a) to 27(c) as follows: FIG. 24 is a block diagram showing the arrangement of an automatic focus detecting device arranged as the fifth embodiment of this invention. FIGS. 25(a) to 25(c) show images of a field including a far-distance view and a near-distance view. FIGS. 26(a) to 26(c) are characteristic diagrams showing autocorrelation functions corresponding to FIGS. 25(a) to 25(c). FIGS. 27(a) to 27(c) show how the far-distance view and the near-distance view corresponding to FIGS. 25(a) to 25(c) are separated from each other. In these drawings, the parts of the fifth embodiment which are the same as those of the first embodiment are indicated by the same reference numerals as in the case of the first embodiment.

The fifth embodiment differs from the first embodiment in that the detection area discriminating means 118 of FIG. 3 is replaced with far-view/near-view separating means 118C.

In the case of FIGS. 25(a) to 25(c), the field of view consists of a far-distance view and a near-distance view. The near-distance view includes two persons 33 and 34. The far-distance view includes a tree 32 which is seen between the two persons 33 and 34. FIG. 25(a) shows an image in which the tree 32 of the far-distance view is in focus. FIG. 25(b) shows an image in which an intermediate part between the tree 32 of the far-distance view and the persons 33 and 34 of the near-distance view is in focus. FIG. 25(c) shows an image in which the persons 33 and 34 of the near-distance view are in focus.

By computing the autocorrelation functions for the images shown in FIGS. 25(a), 25(b) and 25(c), the autocorrelation functions are obtained respectively as shown in FIGS. 26(a), 26(b) and 26(c). FIG. 26(a) shows two peaks e and f. The peak e corresponds to the tree 32 of the far-distance view. The peak f corresponds to the persons 33 and 34 of the near-distance view. In this case, the focus can be adjusted to the persons 33 and 34 which are the objects of shooting, because an in-focus position can be detected on the basis of the peak f. FIG. 26(b) shows three peaks g, h and p. The peak h corresponds to the tree 32 of the far-distance view, and the peak p corresponds to the persons 33 and 34 of the near-distance view. Since the tree 32 of the far-distance view has a higher contrast than the persons 33 and 34, the peak h has a higher peak value than the peak p. In that case, if the amount of focus deviation is detected from this state as it is, the photo-taking optical system (the lens) would be focused on the tree 32 of the far-distance view by detecting a focus deviation from the peak h, because the peak h is the highest except the peak g which corresponds to m=0. Then, it would become impossible to focus the lens on the persons 33 and 34 which are the objects of shooting.

To solve this problem, the fifth embodiment is arranged to separate images corresponding to the peaks shown in FIGS. 26(a) to 26(c) into a far-distance view and a near-distance view, as shown in each of FIGS. 27(a) to 27(c). FIG. 27(a) shows images obtained by separating the image data obtained from within the distance measuring frame 20 of FIG. 25(a) into a part 35 corresponding to the peak f of the FIG. 26(a) and a part 36 corresponding to the other peak e of FIG. 26(a). FIG. 27(b) shows images obtained by separating the image data obtained from within the distance measuring frame 20 of FIG. 25(b) into a part 38 corresponding to the peak h of FIG. 26(b) and a part 37 corresponding to the peak p of FIG. 26(b). FIG. 27(c) shows images obtained by separating the image data obtained from within the distance measuring frame 20 of FIG. 25(c) into a part 39 corresponding to the peak q of FIG. 26(c) and a part 40 corresponding to the peak r of FIG. 26(c).

Then, the fifth embodiment compares the number of the picture elements of the image corresponding to the far-distance view and that of the image corresponding to the near-distance view with each other. In FIG. 27(a), the number of picture elements (area) of the part 35 is larger than that of the part 36. In FIG. 27(b), the number of picture elements of the part 37 is larger than that of the part 38. In FIG. 27(c), the number of picture elements of the part 39 is larger than that of the part 40. In the case of FIGS. 27(a) to 27(c), the peaks which correspond to the larger parts are peaks f, p and q of FIGS. 26(a) to 26(c). These peaks thus correspond to the persons 33 and 34 which are of the near-distance view. Therefore, the state of focus can be detected for the persons 33 and 34 which are the objects of shooting for all the images shown in FIGS. 25(a), 25(b) and 25(c) by inferring the amounts of focus deviation from these peaks.

The fifth embodiment is thus arranged to be capable of correctly detecting focusing information for a desired object of shooting by comparing the numbers of picture elements when a far-distance view and a near-distance view coexist within one and the same field.

(Other Embodiments)

In the first embodiment described in the foregoing, the signal level deciding circuit 117 in FIG. 3 may be arranged to remove any portion of image signal exceeding predetermined upper and lower threshold values from the image signal X(i,j) coming from the image sensor 112 and to detect the focusing information on the basis of the image signal which is within the predetermined level range. Generally, a part of the image signal X(i,j) having an extremely high level of luminance is near to a saturation level and makes it difficult to adequately take out the amount of changes taking place in the image signal, while a part having a low luminance level is buried in noises to prevent effective information from being taken out. However, these difficult image signal parts are removed by the above-stated modification in setting a focusing information detection area.

The modification is not only capable of accurately detecting a peak position resulting from a focus deviation in the same manner as the first embodiment, even in the event of an object of shooting including a periodic pattern, but also computes the autocorrelation function only for an effective image signal part, so that the speed of a computing operation for detection can be increased.

As described in detail in the foregoing, the automatic focus detecting device according to this invention is arranged such that, with an image signal obtained by forming an image on the image sensor, an area from which the image signal is obtained is decided to be suited or not suited for detection of focusing information on the basis of the state of the image signal and then the focusing information detecting area is set on the basis of the result of the decision. Therefore, even in the event of an object of shooting including a periodic pattern, a peak position resulting from a focus deviation can be accurately detected. Besides, since the correlation computing operation is performed only on an effective part of the image signal, the detecting computation can be carried out at a high speed.

Further, in accordance with the arrangement of the embodiment described, the image signal obtained by forming an image on the image sensor is decided to have or not to have a periodic pattern. Then, according to the result of the decision, a discrimination is made between an in-focus state and an out-of-focus state on the basis of a data signal obtained from an image area having no periodic pattern while avoiding any image area that has a periodic pattern. Therefore, even in the event of an object of shooting having a periodic pattern, some peak position that is caused by a focus deviation can be accurately detected. It is another advantage of the embodiment that, since the correlation computing operation is performed only on an effective part of the image signal, the computation for detection can be carried out at a high speed.

Further, according to the arrangement of the automatic focus detecting device arranged as the embodiment of this invention, the reliability of each peak position is decided on the basis of the states of a plurality of peak values of the autocorrelation function computed and obtained from the image signal obtained with an image formed on the image sensor. Therefore, a highly reliable focusing information can be obtained according to the result of the decision.

As described above, the automatic focus detecting device according to the embodiment of this invention is arranged to separate an image obtained from within a distance measuring frame into a far-distance view and a near-distance view, to compare the areas or the numbers of picture elements of images corresponding to the far-distance view and the near-distance view with each other and to adjust the focus to the image which is thus found to have a larger area or a larger number of picture elements. Therefore, the embodiment is free from the problem of the so-called far-and-near competition even in a case where a far-distance view and a near-distance view coexist in one and the same field of view.

What is claimed is:

1. An automatic focus detecting device for detecting a focusing condition on the basis of an image output from an image sensor, comprising:

discriminating means for discriminating an area of the image which is not suited for detecting the focusing condition, on the basis of a predetermined signal component of the image signal;

focus area setting means for setting a focus area on an image sensing plane of said image sensor from which is eliminated an area thereon determined on the basis of an output of said discriminating means and corresponding to the area of the image detected by said discriminating means as not suited for detecting the focus condition; and focus detecting means for detecting the focusing condition on the basis of a focus signal corresponding to the focus area.

2. A device according to claim 1, wherein said discriminating means detects an outline of the object image.

3. A device according to claim 2, wherein said focus area setting means sets an area formed by the outline of the object image as the focus detecting area.

4. A device according to claim 3, wherein the focus detecting area, covers a region from a portion where a maximum value of a self-correlation signal of an image signal of the outline portion of the object image occurs to a portion where a predetermined level change of the self-correlation signal occurs.

5. A device according to claim 4, wherein said focus detecting means performs focus adjustment on the basis of computation results of the self-correlation of the image signal in the focus detecting area.

6. A video camera apparatus, comprising image sensing means for sensing an image on an image sensing plane and outputting an image signal;

discriminating means for discriminating an area of the image which is suited for detecting the focusing condition and eliminating an area of the image which is not suited for detecting the focusing condition, on the basis of a predetermined signal component of the image signal;

focus area setting means for setting a focus area on the image sensing plane on the basis of an output of said discriminating means and corresponding to the area of the image discriminated by said discriminating means as suited for detecting the focus condition; and focus detecting means for detecting the focusing condition on the basis of a focus signal corresponding to the focus area.

7. An apparatus according to claim 6, wherein said discriminating means discriminates an outline portion and a peripheral portion of the outline portion as the focus detecting area.

8. An apparatus according to claim 7, wherein the focus detecting area covers a region from a portion where a maximum value of the self-correlation signal of the image signal of the outline portion occurs to a portion where a predetermined level change of the self-correlation signal occurs.

9. An apparatus according to claim 8, wherein said focus detecting means performs focus adjustment on the basis of results of computation of the self-correlation of the image signal in the focus detecting area.

10. A detecting area setting device, comprising:

image sensing means for sensing an object image on an image sensing plane and outputting an image signal;

discriminating means for discriminating an outline of the image on the image sensing plane by comparing the image signal with a predetermined threshold level;

area setting means for setting a shape of a focus detecting area along the outline of the image on the image sensing plane on the basis of an output of said discriminating means; and detecting means for detecting a focus condition on the basis of a predetermined signal corresponding to the focus detecting area.

11. A device according to claim 10, wherein said area setting means sets as the focus detecting area an outline portion and a peripheral portion of the object image.

12. A device according to claim 11, wherein said area setting means sets as the focus detecting area the peripheral portion covering from a position where a focus self-correlation signal of the image signal of the outline portion is a maximum value to a position where the self-correlation signal changes a predetermined level.

* * * * *

UNITED STATES PATENT AND TRADEMARK OFFICE
CERTIFICATE OF CORRECTION

PATENT NO.    : 6,124,890
DATED         : September 26, 2000
INVENTOR(S)   : Tomotaka Muramoto It is certified that error appears in the above-identified patent and that said Letters Patent is hereby corrected as shown below:

Column 1,
Line 53, delete "variable T" and insert "variable $\tau$".

Signed and Sealed this

Eighteenth Day of December, 2001

Attest:

JAMES E. ROGAN
*Attesting Officer*     *Director of the United States Patent and Trademark Office*